(12) United States Patent
Fang et al.

(10) Patent No.: US 12,724,867 B2
(45) Date of Patent: Sep. 1, 2026

(54) CROSS-DEVICE AUTHENTICATION USING TARGET AUTHENTICATION MANNER METHOD AND ELECTRONIC DEVICE

(71) Applicant: Huawei Technologies Co., Ltd., Shenzhen (CN)

(72) Inventors: Xiwen Fang, Shanghai (CN); Xiaoshuang Ma, Beijing (CN); Xin Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 18/264,324

(22) PCT Filed: Mar. 23, 2021

(86) PCT No.: PCT/CN2021/082278

§ 371 (c)(1),
(2) Date: Aug. 4, 2023

(87) PCT Pub. No.: WO2022/165939

PCT Pub. Date: Aug. 11, 2022

(65) Prior Publication Data

US 2024/0095329 A1 Mar. 21, 2024

(30) Foreign Application Priority Data

Feb. 4, 2021 (CN) ......................... 202110155795.3

(51) Int. Cl.
*H04L 9/00* (2022.01)
*G06F 21/32* (2013.01)
*G06F 21/35* (2013.01)

(52) U.S. Cl.
CPC .............. *G06F 21/35* (2013.01); *G06F 21/32* (2013.01)

(58) Field of Classification Search
CPC ................................ G06F 21/35; G06F 21/32
(Continued)

(56) References Cited

U.S. PATENT DOCUMENTS 9,659,160 B2 5/2017 Ligatti et al.
10,218,506 B1 2/2019 Bhabbur et al.
(Continued)

FOREIGN PATENT DOCUMENTS

CN 107153534 A 9/2017
CN 108241980 A 7/2018
(Continued)

OTHER PUBLICATIONS

Daniel Hintze, et al, "CORMORANT: On Implementing Risk-Aware Multi-Modal Biometric Cross-Device Authentication For Android," Aalto University, Jan. 1, 2019, total 11 pages.
(Continued)

*Primary Examiner* — Haresh N Patel
(74) *Attorney, Agent, or Firm* — Conley Rose, P.C.

(57) ABSTRACT

A method includes: a first electronic device that receives a target operation performed by a user on a first interface of the first electronic device for triggering access to a first service, and the first service is associated with a second electronic device. The first electronic device obtains a target authentication manner corresponding to the target operation, acquires authentication information based on the target authentication manner, and sends an authentication request to the second electronic device. The authentication request includes the authentication information and is for requesting the second electronic device to perform authentication on the first service, and the second electronic device generates an authentication result after performing authentication on the first service.

20 Claims, 16 Drawing Sheets

(58) Field of Classification Search
USPC .......................................................... 726/18
See application file for complete search history.

(56) References Cited

U.S. PATENT DOCUMENTS

| | | | | |
|---|---|---|---|---|
| 10,609,037 | B2 | 3/2020 | Jackson et al. | |
| 11,256,392 | B2 * | 2/2022 | Ponnusamy | G06F 3/0481 |
| 11,347,834 | B2 | 5/2022 | Marchand et al. | |
| 11,546,391 | B2 * | 1/2023 | Ponnusamy | H04W 12/06 |
| 11,664,852 | B2 | 5/2023 | Park et al. | |
| 11,876,798 | B2 | 1/2024 | Suresh et al. | |
| 2014/0108506 | A1 * | 4/2014 | Borzycki | H04L 67/1095 709/204 |
| 2016/0048705 | A1 | 2/2016 | Yang et al. | |
| 2016/0344730 | A1 | 11/2016 | Holz | |
| 2017/0026617 | A1 * | 1/2017 | Wang | H04N 7/147 |
| 2017/0126640 | A1 | 5/2017 | Vincent et al. | |
| 2017/0367033 | A9 | 12/2017 | Cherian et al. | |
| 2018/0062846 | A1 | 3/2018 | Li et al. | |
| 2019/0090976 | A1 * | 3/2019 | Wade | G16H 40/63 |
| 2019/0222570 | A1 | 7/2019 | Krishan | |
| 2019/0222576 | A1 | 7/2019 | Borkar et al. | |
| 2019/0273607 | A1 * | 9/2019 | Van Der Velden | H04L 9/088 |
| 2019/0347181 | A1 * | 11/2019 | Cranfill | H04L 63/102 |
| 2020/0402052 | A1 * | 12/2020 | Sloane | H04L 63/105 |
| 2021/0118077 | A1 * | 4/2021 | Kuta | G06Q 20/12 |
| 2022/0239513 | A1 * | 7/2022 | Swierk | G06V 40/18 |

FOREIGN PATENT DOCUMENTS

| | | | | |
|---|---|---|---|---|
| CN | 108550201 A | | 9/2018 | |
| CN | 109670968 A | | 4/2019 | |
| CN | 110535882 A | * | 12/2019 | H04L 63/10 |
| CN | 110892411 | * | 3/2020 | |
| CN | 111221845 A | * | 6/2020 | G06F 16/27 |
| CN | 111343133 A | | 6/2020 | |
| EP | 3139264 A2 | | 3/2017 | |
| EP | 3171309 A1 | | 5/2017 | |
| EP | 3108397 B1 | | 3/2019 | |
| EP | 3605314 A1 | * | 2/2020 | G06F 3/013 |
| EP | 3252637 B1 | | 5/2022 | |
| JP | 2005284452 A | | 10/2005 | |
| JP | 2014119830 A | | 6/2014 | |
| JP | 2018517960 A | | 7/2018 | |
| WO | 2013100549 A1 | | 7/2013 | |
| WO | 2016154898 A1 | | 10/2016 | |

OTHER PUBLICATIONS

HC Volaka et al, “Towards Continuous Authentication on Mobile Phones using Deep Learning Models,” Procedia Computer Science, Jan. 1, 2019, total 8 pages.

D Hintze et al, “CORMORANT: Ubiquitous Risk-Aware Multi-Modal Biometric Authentication across Mobile Devices,” Proceedings of the ACM on Interactive Mobile Wearable and Ubiquitous Technologies, Sep. 9, 2019, total 23 pages.

H Crawford et al, “A framework for continuous, transparent mobile device authentication,” Computers and Security, May 2013, total 10 pages.

W. Denniss et al, “OAuth 2.0 Device Authorization Grant,” Internet Engineering Task Force (IETF), RFC 8628, Aug. 2019, total 21 pages.

* cited by examiner

CROSS-DEVICE AUTHENTICATION USING TARGET AUTHENTICATION MANNER METHOD AND ELECTRONIC DEVICE

CROSS-REFERENCE TO RELATED APPLICATIONS

This is a U.S. National Stage of International Patent Application No. PCT/CN2021/082278 filed on Mar. 23, 2021, which claims priority to Chinese Patent application Ser. No. 202110155795.3 filed on Feb. 4, 2021. The disclosures of the aforementioned applications are hereby incorporated by reference in their entireties.

TECHNICAL FIELD

This application relates to the field of communication technologies, and in particular, to a cross-device authentication method and an electronic device.

BACKGROUND

With the development of electronic technologies and the mobile Internet, one user may have more terminals such as a mobile phone, a tablet computer, a personal computer (personal computer, PC), and a smart home device (for example, a smart television). Generally, each terminal is used independently. In a scenario in which a plurality of terminals need to be used in a collaborative manner, for example, a collaborative office scenario, the user connect the plurality of terminals for use. For example, the user has one PC and one mobile phone. The user may connect the PC and the mobile phone for cooperative use in a wireless or wired manner, to implement collaborative office using the PC and the mobile phone.

Currently, in consideration of data security, a user usually performs security setting, for example, lock screen password setting or fingerprint unlocking, on an electronic device. Especially for a highly sensitive operation (for example, a payment operation), the electronic device usually further needs the user to perform secondary authentication (for example, entering a payment password+facial recognition). Currently, in a PC-mobile phone collaborative office scenario, when the user accesses data on a mobile phone at a PC end, the user has to perform an authentication operation on the mobile phone for data access. For example, the user performs an operation such as entering a lock screen password or fingerprint authentication on the mobile phone, so that the user can further obtain data of the mobile phone on the PC. In this case, the user has to operate the PC for a while and then operate the mobile phone for a while, resulting in complex operations. If the mobile phone is not near the user by chance, operation inconvenience is brought to the user. Therefore, it can be learned that, in a scenario in which terminals are used in a collaborative manner, in a device authentication process, there are problems that an operation is not convenient and quick, and user experience is poor.

SUMMARY

This application provides an authentication method and an electronic device, to implement cross-device authentication, to improve convenience of an authentication operation.

According to a first aspect, an embodiment of this application provides an authentication method. The method may be applied to a first electronic device, the first electronic device may be connected to a second electronic device in a wired or wireless manner, and the method includes:

The first electronic device receives a target operation performed on a first interface of the first electronic device. The target operation is for triggering access to a first service, and the first service is associated with the second electronic device. The first electronic device obtains a target authentication manner corresponding to the first service, the first electronic device acquires authentication information based on the target authentication manner; and then the first electronic device sends an authentication request to the second electronic device. The authentication request includes the authentication information, and the authentication request is for requesting the second electronic device to perform authentication on the first service. That the first service is associated with the second electronic device may be that the first service is a service in the second electronic device, or the first service is associated with sensitive data of the second electronic device, or the first service is a service of the second electronic device.

In the foregoing method, the first electronic device may acquire the authentication information, and the second electronic device may perform authentication on the authentication information, to implement cross-device acquisition of the authentication information, thereby improving convenience of an authentication operation, preventing a user from performing an operation on a plurality of electronic devices, and improving user experience. In addition, the first electronic device and the second electronic device cooperatively perform authentication on the first service, which can improve security of an authentication result, and avoid a problem that security of the authentication result is low because a single electronic device is limited by hardware or an authentication capability and an acquisition capability are insufficient.

In a possible design, the method further includes: The first electronic device receives an authentication result sent by the second electronic device; and then the first electronic device responds to the target operation based on the authentication result. For example, in a non-multi-screen collaboration scenario, the first electronic device may make a payment success response or a payment failure response to a payment operation based on the authentication result of the second electronic device.

In a possible design, the method further includes: The first electronic device receives the authentication result sent by the second electronic device; and in response to the authentication result, the first electronic device switches from displaying the first interface to displaying a second interface. The second interface includes a result of triggering the first service. For example, in a multi-screen collaboration scenario, after the second electronic device performs authentication on the payment operation, interface switching occurs, and the interface is synchronized to the first electronic device. Therefore, interface switching also occurs in the first electronic device.

The multi-screen collaboration scenario refers to that the first electronic device and the second electronic device perform multi-screen collaboration, the target operation is performed on a first object in a first window in the first interface, the first window is a display window of the second electronic device, and the first service is a service of the second electronic device.

In a possible design, that the first electronic device obtains a target authentication manner corresponding to the first service includes:

The first electronic device locally obtains, from the first electronic device, the target authentication manner corresponding to the first service. It should be understood that, before this, the first electronic device needs to perform resource synchronization with the second electronic device, that is, the first electronic device and the second electronic device need to synchronize authentication manners corresponding to different services or authentication manners corresponding to different operations, so that the first electronic device decides the target authentication manner corresponding to the first service. If the first electronic device has a secure execution environment, the method can improve security of the authentication result to a specified extent.

In a possible design, the first electronic device may obtain, from the second electronic device, the target authentication manner corresponding to the first service. Alternatively, the first electronic device may send a request message to the second electronic device, and then the second electronic device sends the authentication manner to the first electronic device. In this method, the first electronic device decides the target authentication manner corresponding to the first service. Optionally, the first electronic device may also perform resource synchronization with the second electronic device, that is, the first electronic device and the second electronic device synchronize authentication manners corresponding to different services or authentication manners corresponding to different operations, so that the first electronic device decides the target authentication manner corresponding to the first service. For example, when the first electronic device has an acquisition capability, the first electronic device is preferentially used to perform acquisition.

According to a second aspect, an embodiment of this application provides an authentication method. The method may be applied to a second electronic device, a first electronic device may be connected to the second electronic device in a wired or wireless manner, and the method includes:

The second electronic device receives a request message from the first electronic device. The request message is for requesting a target authentication manner corresponding to a first service, and the first service is associated with the second electronic device. The second electronic device sends the target authentication manner corresponding to the first service to the first electronic device. The second electronic device may further receive an authentication request from the first electronic device. The authentication request includes authentication information. The second electronic device then performs authentication on the first service based on the authentication information, and generates an authentication result.

In the method, the second electronic device decides the target authentication manner corresponding to the first service, and the second electronic device performs authentication by using the authentication information obtained from the first electronic device, so that collaborative authentication between the first electronic device and the second electronic device can be completed, to improve security and reliability of the authentication result, and avoid a problem that security of the authentication result is low because a single device is limited by hardware or an authentication capability and an acquisition capability are insufficient.

In a possible design, the method further includes: The second electronic device sends the authentication result to the first electronic device. The authentication result is for triggering the first electronic device to respond to a target operation that triggers the first service.

In a possible design, the second electronic device may respond, based on the authentication result, to the target operation that triggers the first service, to switch from a first interface to a second interface. The second interface includes a result of triggering the first service. The second electronic device then synchronize the second interface to the first electronic device.

In a possible design, that the first service is associated with the second electronic device includes:

The first service is a service in the second electronic device, or the first service is associated with sensitive data of the second electronic device, or the first service is a service of the second electronic device.

In a possible design, the first electronic device and the second electronic device perform multi-screen collaboration, the target operation that triggers access to the first service is performed on a first object in a first window, the first window is a display window of the second electronic device, and the first service is a service of the second electronic device.

For beneficial effects of the second aspect, refer to the first aspect. Details are not described herein again.

According to a third aspect, an embodiment of this application provides a cross-device authentication method. The method may be applied to a first electronic device, the first electronic device is connected to a second electronic device, and the method includes:

The first electronic device receives a target operation performed by a user on the first electronic device. The target operation is for triggering access to a first service, and the first service is associated with the second electronic device. The first electronic device determines, based on a resource pool, an authentication manner corresponding to the first service. The resource pool includes an authentication manner corresponding to an operation of the second electronic device and an authentication information template. The first electronic device acquires the authentication information based on the authentication manner; and then performs authentication on the first service by using the authentication information, and generates an authentication result.

Optionally, the first electronic device may further send the authentication result to the second electronic device, so that the second electronic device responds.

In the method, by using the authentication manner obtained from the second electronic device, the first electronic device acquires the authentication information and performs authentication, to improve convenience of an authentication operation, prevent a user from performing an operation on a plurality of electronic devices, and improve user experience. In addition, the first electronic device and the second electronic device cooperatively perform authentication on the first service, which can improve security of an authentication result, and avoid a problem that security of the authentication result is low because a single electronic device is limited by hardware or an authentication capability and an acquisition capability are insufficient.

In a possible design, before the first electronic device receives the target operation performed by the user on the first electronic device, the method further includes:

The first electronic device may further synchronize a resource from the second electronic device, to generate the resource pool. The resource pool further includes an authentication manner corresponding to an operation of the first electronic device and the authentication information template. In this way, the first electronic device may determine the authentication manner by using the resource pool, and perform authentication on the acquired authentication information by using the authentication information template.

According to a fourth aspect, an embodiment of this application provides a first electronic device, including a processor and a memory. The memory is configured to store one or more computer programs; and when the one or more computer programs stored in the memory are executed by the processor, the first electronic device is enabled to implement the method according to any possible design of the first aspect or the third aspect.

According to a fifth aspect, an embodiment of this application provides a second electronic device, including a processor and a memory. The memory is configured to store one or more computer programs; and when the one or more computer programs stored in the memory are executed by the processor, the second electronic device is enabled to implement the method according to any possible design of the first aspect or the third aspect.

According to a sixth aspect, an embodiment of this application further provides an apparatus. The apparatus includes modules/units that perform the method according to any possible design of any one of the foregoing aspects. These modules/units may be implemented by hardware, or may be implemented by hardware by executing corresponding software.

According to a seventh aspect, an embodiment of this application further provides a computer-readable storage medium. The computer-readable storage medium includes a computer program, and when the computer program is run on an electronic device, the electronic device is enabled to perform the method in any possible design of any one of the foregoing aspects.

According to an eighth aspect, an embodiment of this application further provides a computer program product. When the computer program product is run on a terminal, the electronic device is enabled to perform the method in any possible design of any one of the foregoing aspects.

According to a ninth aspect, an embodiment of this application further provides a chip. The chip is coupled to a memory, and is configured to execute a computer program stored in the memory, to perform the method in any possible design of any one of the foregoing aspects.

For technical effects that can be achieved by the designs in any one of the second aspect to the sixth aspect, refer to descriptions of technical effects that can be achieved by the designs in the first aspect. Details are not described herein again.

DESCRIPTION OF EMBODIMENTS

Figure 1A:
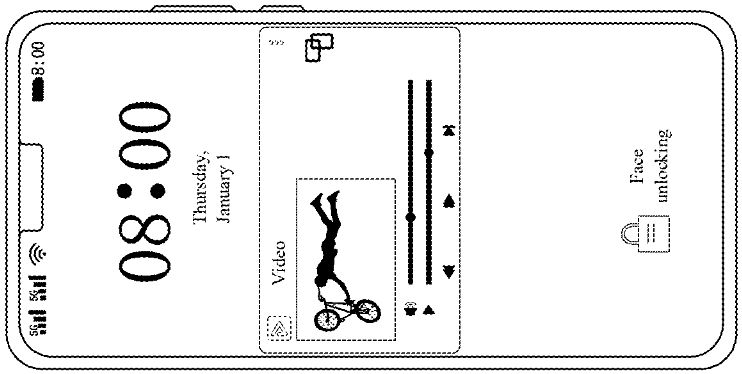
FIG. 1A is a schematic diagram of a multi-screen collaboration scenario of an electronic device.

The following describes technical solutions in embodiments of this application with reference to the accompanying drawings in embodiments of this application. In the descriptions of embodiments of this application, terms used in the following embodiments are merely intended to describe purposes of specific embodiments, but are not intended to limit this application. As used in the specification and the appended claims of this application, the singular expressions "a/an", "one", "said", "foregoing", "the" and "this" are intended to also include such expressions as "one or more", unless otherwise clearly indicated in the context. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the one or more embodiments. Therefore, statements such as "in an embodiment", "in some embodiments". "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes a direct connection and an indirect connection, unless otherwise indicated. "First" and "second" are merely intended for a purpose of description, and shall not be understood as an indication or implication of relative importance or implicit indication of the number of indicated technical features.

In embodiments of this application, the word “example”, “for example”, or the like is used to represent giving an example, an illustration, or a description. Any embodiment or design scheme described as “example” or “for example” in embodiments of this application should not be explained as being more preferred or having more advantages than another embodiment or design scheme. Exactly, use of the word “example”, “for example”, or the like is intended to present a relative concept in a specific manner.

Before the technical solutions in embodiments of this application are described, some terms in this application are explained and described to facilitate understanding of a person skilled in the art.

The following describes some concepts involved in embodiments of this application.

(1) A security environment of an authentication device may include: an integrated secure element (integrated Secure Element, inSE) level, a trusted execution environment (trusted execution environment, TEE) level, a white box, and a key segment.

In embodiments of this application, the integrated secure element may be an independent secure element built in a main chip, and provides functions such as secure storage of private information and secure execution of an important program. A root key protected by using the inSE level has a high security level and hardware tampering can be avoided.

In embodiments of this application, the TEE may be a hardware security isolation area of a main processor, and provides functions such as confidentiality and integrity protection for code and data, and secure access to an external device. A root key protected by using the TEE level has a high security level, and may reach a hardware security level.

(2) A distributed storage system (distributed storage system) splits and stores data on a plurality of independent devices. In a conventional network storage system, a centralized storage server is used to store all data. The storage server becomes a bottleneck of system performance and also a focus of reliability and security, and cannot satisfy a requirement of a large-scale storage application. A distributed network storage system uses an extensible system structure, uses a plurality of storage servers to share storage load, and uses a location server to locate storage information. The distributed network storage system not only improves reliability, availability, and access efficiency of the system, but also is easily extensible.

(3) Authentication information may include: user secret data, biometric feature data, and the like. The user secret data may include a lock screen password of a user, a protection password of the user, and the like. The biometric feature data may include one or more of the following: a physical biometric feature, a behavioral biometric feature, and a soft biometric feature. The physical biological feature may include: a face, a fingerprint, an iris, a retina, a deoxyribonucleic acid (deoxyribonucleic acid, DNA), skin, a hand shape, and a vein. The behavioral biometric feature may include: a voiceprint, a signature, and a gait. The soft biometric feature may include: gender, age, height, weight, and the like.

(4) A service refers to a transaction that is executed by a device to implement its functions or services. For example, the service may be an unlocking service, a payment service, a door opening service, an artificial intelligence (artificial intelligence, AI) computing service, various application services, a distribution service, or the like.

Figure 1A:
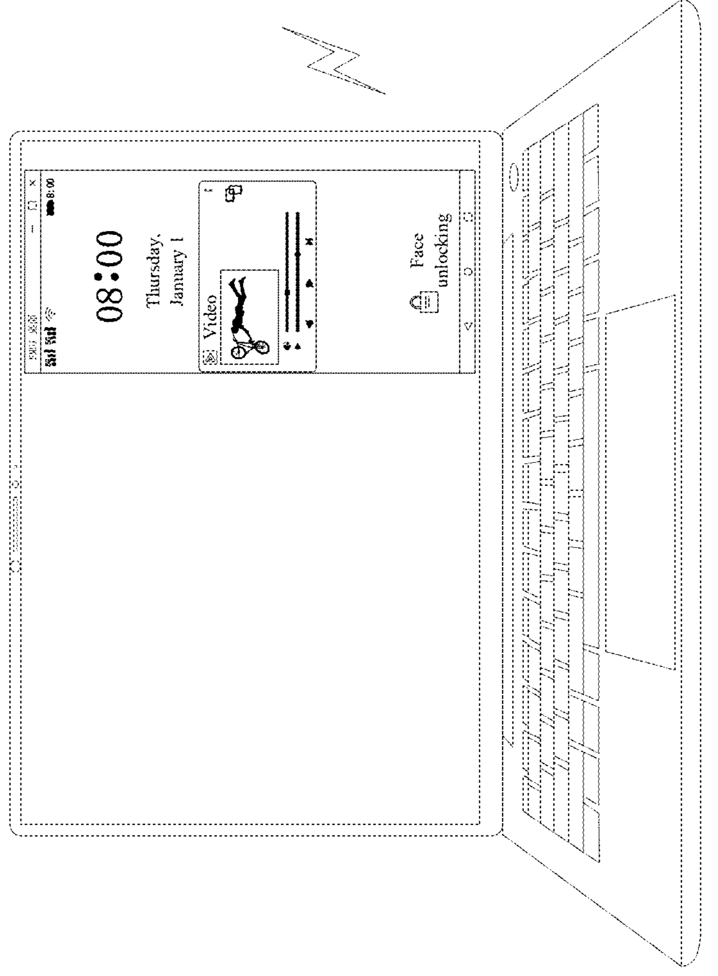
Figure 1B:
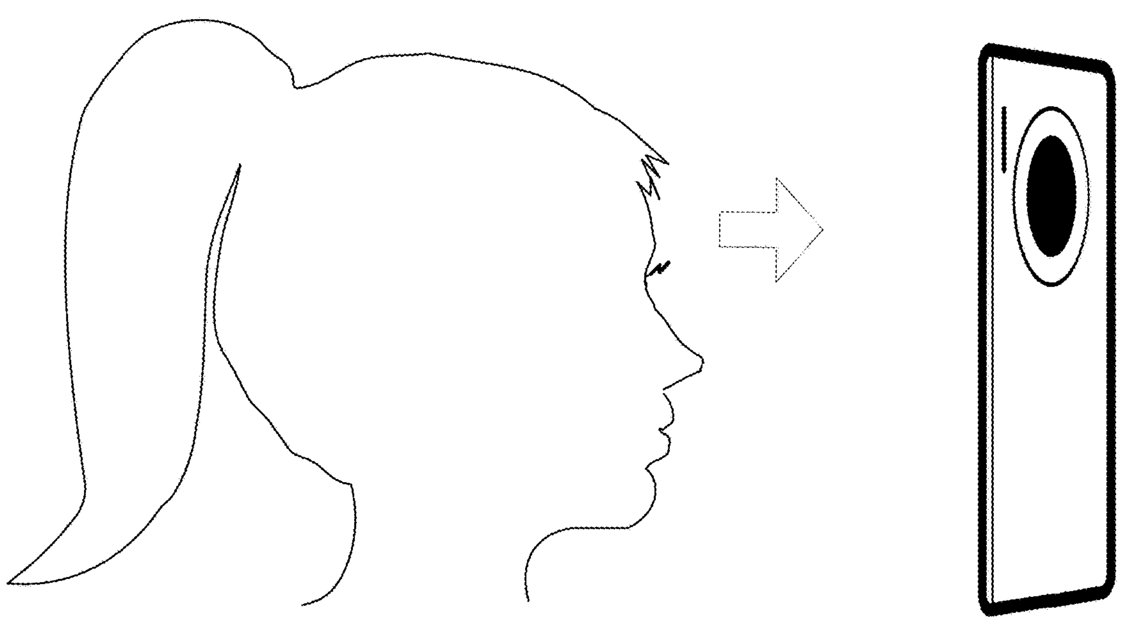
FIG. 1B is a schematic diagram of acquiring a face image by a mobile phone.

Currently, an identity authentication method of an electronic device does not support cross-device authentication. For example, the user has a PC and a mobile phone. The user may connect the PC and the mobile phone for cooperative use in a wireless or wired manner, to implement collaborative office of the PC and the mobile phone. When the PC and the mobile phone cooperatively work, a display interface of the PC further includes an interface of the mobile phone. It is assumed that the user does not operate the mobile phone for a long time, and the interface of the mobile phone is locked, as shown in FIG. 1A. To unlock a screen, the user has to operate the mobile phone to perform face unlocking. For example, as shown in FIG. 1B, the user has to face a mobile phone end, so that a front-facing camera of the mobile phone end acquires a face image of the user. After the face image is acquired, the mobile phone end performs authentication on the acquired face image. If the authentication succeeds, the mobile phone successfully unlocks the screen. For example, when authentication on the mobile phone succeeds, the mobile phone displays a main menu interface, and the interface of the mobile phone in the display interface of the PC also synchronously displays the main menu interface.

It can be seen that, currently, when the user accesses data of another electronic device (for example, the mobile phone) on an electronic device (for example, the PC), and identity authentication needs to be performed, authentication information acquisition and authentication operations have to be performed on the accessed electronic device (for example, a tablet computer), which brings inconvenience to user operations.

To resolve the foregoing problem, an embodiment of this application provides a cross-device authentication method. According to the method, a user can access an interface and data of a second electronic device (for example, a mobile phone) on a first electronic device (for example, a PC), and when the second electronic device needs to perform identity authentication on an operating user, acquisition of user-related authentication information may be completed on the first electronic device that the user currently operates, and then the acquired authentication information may be sent to the second electronic device, and the second electronic device performs authentication on the authentication information and generates an authentication result. It can be seen that, according to the method, the user can complete acquisition of the authentication information by operating only the first electronic device, which helps improve convenience of an authentication operation, improve use efficiency of multi-terminal collaborative use, and further improve use experience of the user.

The following describes implementations of embodiments of this application in detail with reference to the accompanying drawings.

Figure 2:
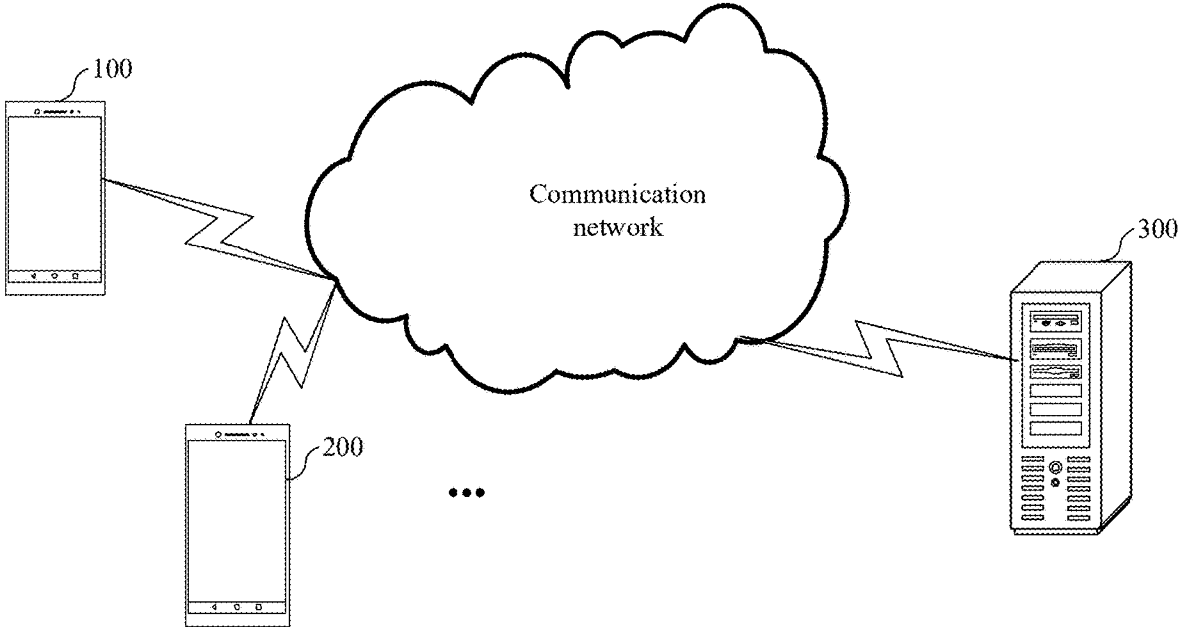
FIG. 2 is a schematic diagram of a communication system according to an embodiment of this application.

FIG. 2 is a simplified schematic diagram of a system architecture to which the foregoing method may be applied according to an embodiment of this application. As shown in FIG. 1, the system architecture may include at least an electronic device 100 and an electronic device 200.

The electronic device 100 and the electronic device 200 may establish a connection in a wired or wireless manner. Based on the established connection, the electronic device 100 and the electronic device 200 may be used together. In this embodiment, a wireless communication protocol used when the electronic device 100 and the electronic device 200 establish a connection in a wireless manner may be a wireless fidelity (wireless fidelity. Wi-Fi) protocol, a Bluetooth (Bluetooth) protocol, a ZigBee protocol, a near field communication (Near Field Communication, NFC) protocol, various cellular network protocols, or the like. This is not specifically limited herein. In the following, the electronic device 100 is also referred to as a first electronic device, and the electronic device 200 is also referred to as a second electronic device.

In specific implementation, each of the electronic device 100 and the electronic device 200 may be a mobile phone, a tablet computer, a handheld computer, a personal computer (personal computer, PC), a cellular phone, a personal digital assistant (personal digital assistant, PDA), a wearable device (for example, a smart watch), a smart home device (for example, a television), an in-vehicle computer, a game console, an augmented reality (augmented reality, AR)\virtual reality (virtual reality, VR) device, or the like. Specific device forms of the electronic device 100 and the electronic device 200 are not specially limited in this embodiment. In addition, in this embodiment, device forms of the electronic device 100 and the electronic device 200 may be the same. For example, both the electronic device 100 and the electronic device 200 are mobile phones. The device forms of the electronic device 100 and the electronic device 200 may also be different. As shown in FIG. 1, the electronic device 100 is a PC, and the electronic device 200 is a mobile phone.

The electronic device 100 and the electronic device 200 may be touchscreen devices, or may be non-touchscreen devices. In this embodiment, both the electronic device 100 and the electronic device 200 are terminals that can run an operating system, install an application, and have a display (or a display screen). A display screen that includes only a display processing module is not the electronic device 100 or the electronic device 200 in this embodiment. An operating system of the electronic device 100 or the electronic device 200 may be an Android system, an iOS system, a windows system, a mac system, a Linux system, or the like. This is not specifically limited in this embodiment. Operating systems of the electronic device 100 and the electronic device 200 may be the same, or may be different. In an example, the electronic device 100 and the electronic device 200 may separately include a memory, a processor, and a display. The memory may be configured to store the operating system, and the processor may be configured to run the operating system stored in the memory.

In this embodiment of this application, when the electronic device 100 is connected to the electronic device 200, the user may operate, by using an input device (such as a mouse, a touchpad, or a touchscreen) of the electronic device 100, a UI element displayed on the display screen of the electronic device 100, such as an application window, a freeform small window, a video assembly, a floating window, a picture in picture, a widget, or a UI control, to implement multi-screen collaborative use.

In a possible embodiment of this application, the system architecture may further include a server 300, and the electronic device 100 may establish a connection to the electronic device 200 in a wired or wireless manner through the server 300.

The electronic device 100 and the electronic device 200 may be any electronic devices having a service processing function in the art, for example, may be a combination of any two electronic devices having a service processing function, such as any two of a smart speaker, a smart lock, a smart screen, a mobile phone, a tablet computer, an intelligent wearable device, a computer, a smart camera, an in-vehicle infotainment, a game console, a projector, and a remote control.

Figure 3:
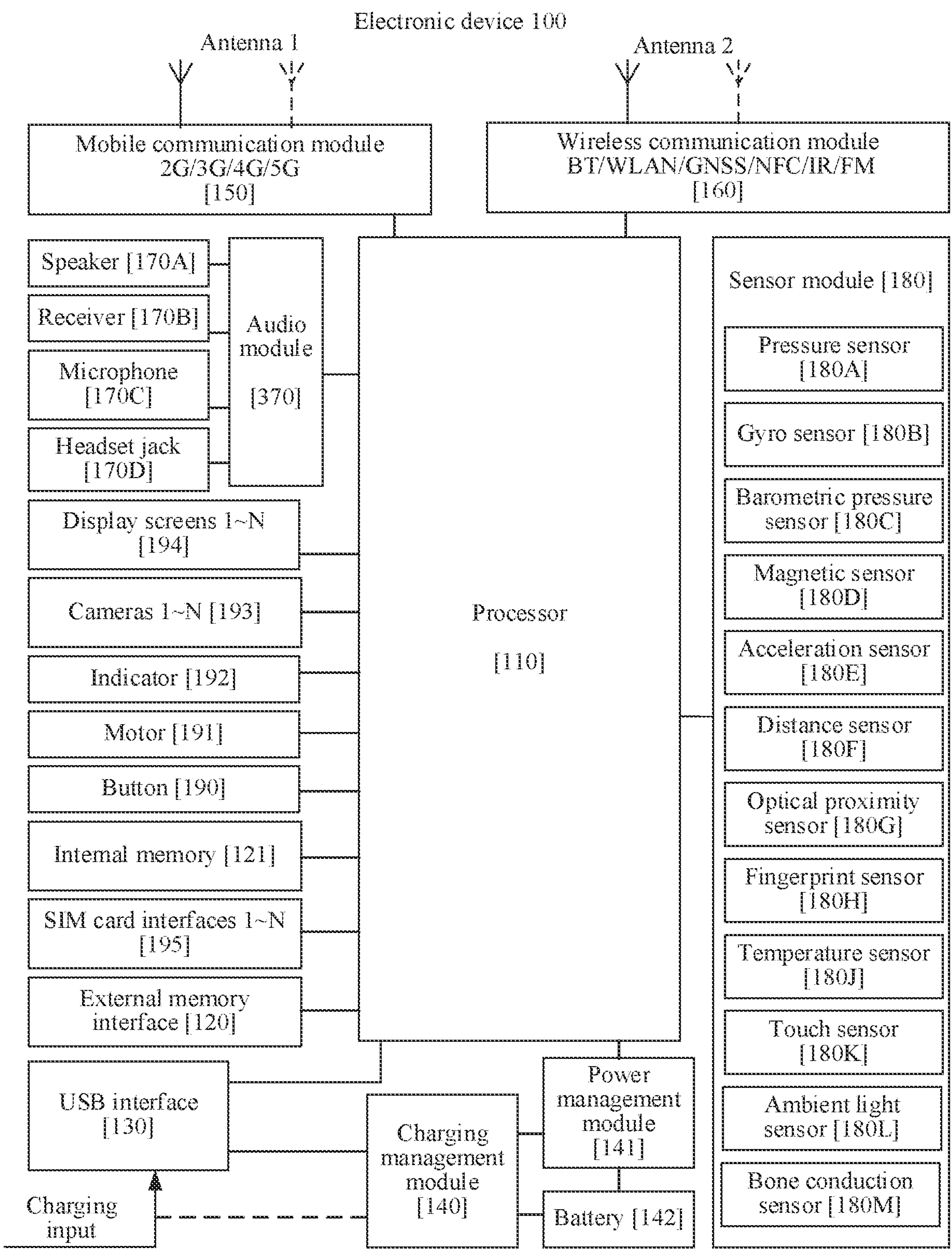
FIG. 3 is a schematic diagram of a structure of a mobile phone according to an embodiment of this application.

FIG. 3 is a schematic diagram of a structure of an electronic device 100 according to an embodiment of this application. A method in the following embodiment may be implemented in the electronic device 100 having the foregoing hardware structure.

As shown in FIG. 3, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, and the like. Optionally, the electronic device 100 may further include a mobile communication module 150, a subscriber identification module (subscriber identification module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The charging management module 140 is configured to receive a charging input from a charger. The charging management module 140 may further supply power to the electronic device 100 through the power management module 141 while charging the battery 142. The power management module 141 is configured to be connected to the battery 142, the charging management module 140, and the processor 110. The power management module 141 may also receive an input of the battery 142 to supply power to the electronic device 100.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

When the electronic device 100 includes the mobile communication module 150, the mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display screen 194. In some embodiments, the modem processor may be an independent component. In some other embodiments, the modem processor may be independent of the processor 110, and the modem processor and the mobile communication module 150 or another functional module may be disposed in a same component.

The wireless communication module 160 may provide a solution to wireless communication that is applied to the electronic device 100 and includes a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), NFC, an infrared radiation (infrared radiation, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display screen 194, the application processor, and the like. The GPU is a microprocessor for image processing, and is connected to the display screen 194 and the application processor. The processor 110 may include one or more GPUs, which execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode. AMOLED), a flex light-emitting diode (flex light-emitting diode, FLED), a mini LED, a micro LED, a micro-OLED, a quantum dot light emitting diode (quantum dot light emitting diodes, QLED), or the like. In some embodiments, the electronic device 100 may include one or N display screen 194, where N is a positive integer greater than 1.

The electronic device 100 may implement a photographing function through the ISP, the camera 193, the video codec, the GPU, the display screen 194, the application processor and the like. In some embodiments, the electronic device 100 may include one or N cameras 193, where N is a positive integer greater than 1.

The external memory interface 120 may be configured to be connected to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, and a capacitive pressure sensor. When a touch operation is performed on the display screen 194, the electronic device 100 detects intensity of the touch operation through the pressure sensor 180A. The electronic device 100 may also calculate a touch location based on a detection signal of the pressure sensor 180A.

The gyro sensor 180B may be configured to determine a motion posture of the electronic device 100. The barometric pressure sensor 180C is configured to measure barometric pressure. The magnetic sensor 180D includes a Hall sensor. The electronic device 100 may detect opening and closing of a flip cover by using the magnetic sensor 180D. The acceleration sensor 180E may detect acceleration values in various directions (usually on three axes) of the electronic device 100. The distance sensor 180F is configured to measure a distance. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking. The ambient light sensor 180L is configured to sense ambient light brightness. The fingerprint sensor 180H is configured to acquire a fingerprint. The electronic device 100 may use a feature of the acquired fingerprint to implement fingerprint unlocking, application lock access, fingerprint photographing, fingerprint call answering, and the like. The temperature sensor 180J is configured to detect a temperature.

The touch sensor 180K is also referred to as a "touch panel". The touch sensor 180K may be disposed on the display screen 194, and the touch sensor 180K and the display screen 194 constitute a touchscreen, which is also referred to as a "touch screen". The touch sensor 180K is configured to detect a touch operation performed on or near the touch sensor. The touch sensor may transfer the detected touch operation to the application processor to determine a touch event type. A visual output related to the touch operation may be provided through the display screen 194. In some other embodiments, the touch sensor 180K may also be disposed on a surface of the electronic device 100 at a location different from that of the display screen 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like.

When the electronic device 100 includes the SIM card interface 195, the SIM card interface 195 is configured to be connected to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

Figure 4:
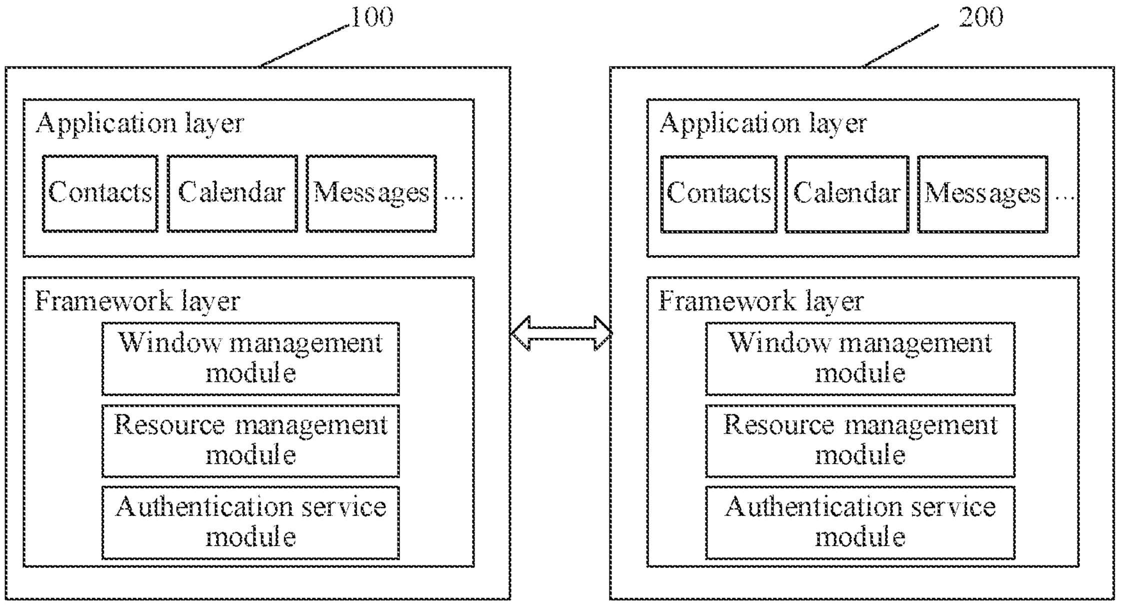
FIG. 4 is a schematic diagram of a structure of software according to an embodiment of this application.

FIG. 4 is a schematic composition diagram of a software architecture according to an embodiment of this application. As shown in FIG. 4, each of software architectures of both an electronic device 100 and an electronic device 200 may include an application layer and a framework layer (framework, FWK).

In some embodiments, the application layer may include various applications installed in the electronic device. For example, the applications installed in the electronic device may include Settings, Calculator, Camera, Messages, a music player, a file manager, Gallery, a browser, Memo, News, a video player, and Email. These applications may be system applications of the electronic device, or may be third-party applications. This is not specifically limited in this embodiment of this application. For example, the application layer of the electronic device 100 may include various applications installed in the electronic device 100, such as a file manager, a calculator, a music player, and a video player. For another example, the application layer of the electronic device 200 may include a file manager, a gallery, a memo, a video player, an email, and the like.

In some embodiments, the framework layer includes a window management module, configured to implement windowing of a display interface. In addition to the window management module, the framework layer may further include a resource management module, configured to manage an acquisition capability, an authentication capability, and authentication information on the electronic device 100 and the electronic device 200. Optionally, the resource management module may further include an authentication manner corresponding to each service in the electronic device 100 and an authentication manner of each service in the electronic device 200. The framework layer may further include an authentication service module, configured to complete identity authentication based on the authentication information.

In this embodiment of this application, after the electronic device 100 establishes a connection to the electronic device 200, based on the foregoing software architecture, a user may operate, by using an input device (such as a mouse, a touchpad, or a touchscreen) of the electronic device 100, a UI element of the second electronic device displayed in the electronic device 100. In addition, the user may acquire the authentication information (such as a face or a fingerprint) by using an acquisition device (such as a camera or a sensor) of the electronic device 100, or the user may enter the authentication information (such as a password, or input a touch operation) on the electronic device 100 by using the input device (such as the mouse, the touchpad, or the touchscreen) of the electronic device 100. The electronic device 100 may send the acquired authentication information to the electronic device 200, and the authentication service module of the electronic device 200 performs authentication on the authentication information and generates an authentication result, thereby implementing cross-device authentication.

It should be noted that the software architecture shown in this embodiment does not constitute a specific limitation on the electronic device 100 and the electronic device 200. In some other embodiments, the electronic device 100 and/or the electronic device 200 may include more or fewer layers than those shown in the figure, or more or fewer modules, or combine some modules, or have different module arrangements. This is not specifically limited in this embodiment. For example, in addition to the foregoing application layer and the foregoing framework layer, the software architecture shown above may further include another layer, for example, a kernel layer (not shown in FIG. 4). The kernel layer is a layer between hardware and software. The kernel layer may include at least a display driver, a camera driver, an audio driver, a sensor driver, and the like.

Embodiment 1

Embodiment 1 relates to FIG. 5 to FIG. 7D.

Figure 5:
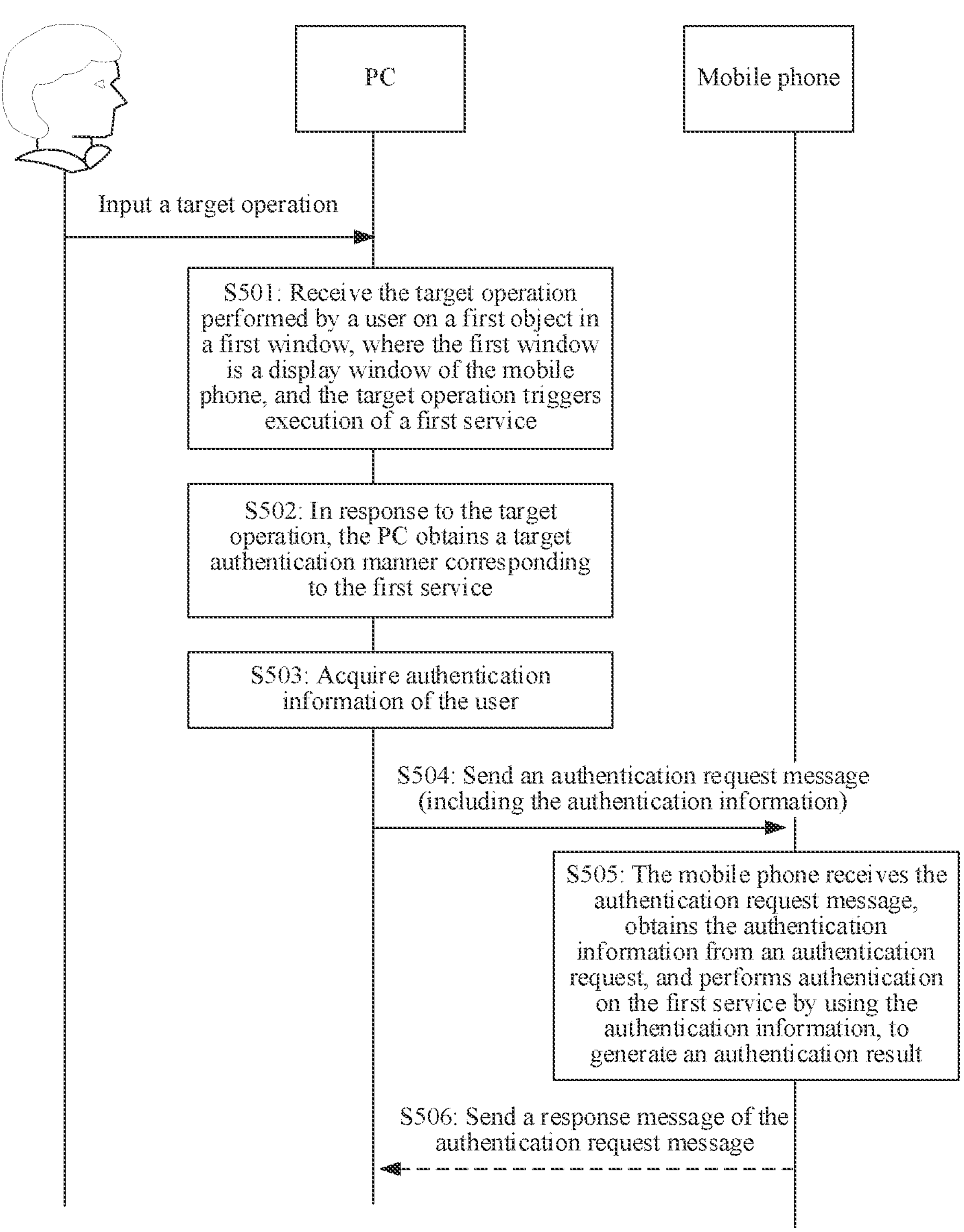
FIG. 5 is a schematic diagram of a cross-device authentication method according to an embodiment of this application.

FIG. 5 is a schematic flowchart of a cross-device authentication method according to an embodiment of this application. In this embodiment, the following describes in detail the cross-device authentication method according to this embodiment by using an example in which a first electronic device is a PC and a second electronic device is a mobile phone. For example, the mobile phone and the PC perform multi-screen collaborative office, an input device of the PC is a mouse, and the PC further has a camera. It should be noted that the cross-device authentication method shown in this embodiment is also applicable to an electronic device of another type.

As shown in FIG. 5, the cross-device authentication method according to this embodiment of this application may include the following S501 to S505.

S501: The PC receives a target operation performed by a user on a first object in a first window, where the first window is a display window projected from the mobile phone onto the PC.

Figure 7A:
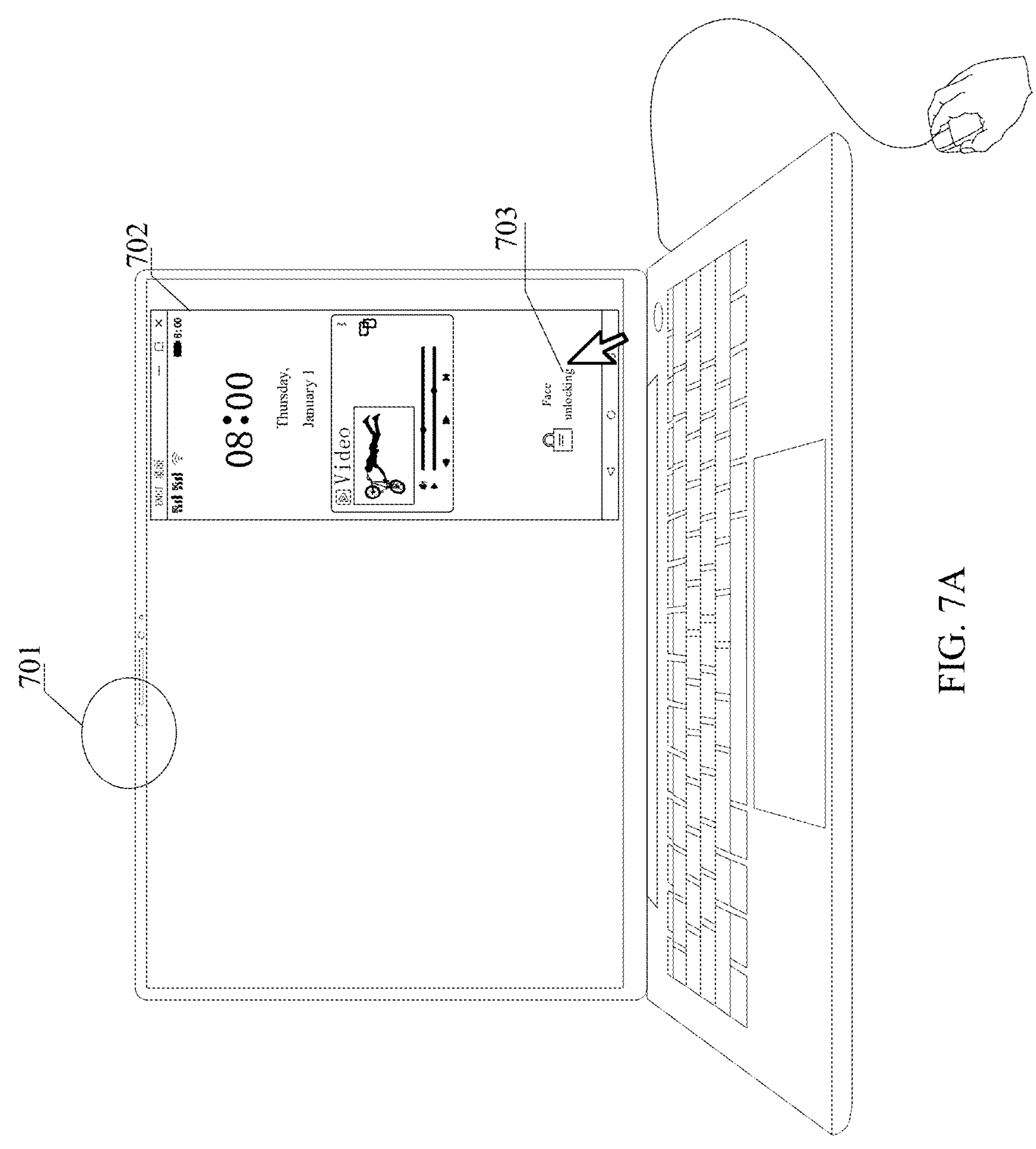
FIG. 7A is a schematic diagram of a PC interface according to an embodiment of this application.

The target operation is for triggering execution of a first service. The first service is a service of the mobile phone. For example, the first service is an unlocking service of the mobile phone. For example, as shown in FIG. 7A, the first window of the mobile phone is displayed in a PC interface, and the first window is a lock screen interface 702. Assuming that the user wants to unlock the mobile phone, the user may perform a tap operation on a face unlocking control 703 in the lock screen interface by operating a mouse of the PC. In other words, the PC may receive the tap operation performed by the user on the face unlocking control 703 in the lock screen interface 702.

Optionally, the PC may alternatively not receive the target operation of the user, that is, may trigger unlocking of the interface 702 without receiving the target operation. For example, the PC may monitor the user through a camera 701, and perform a subsequent step after a face of the user is detected.

S502: In response to the target operation, the PC obtains a target authentication manner corresponding to the first service.

Specifically, the first service is a service in the second electronic device, for example, unlocking or making payment.

In a possible manner, the PC sends an authentication request to the mobile phone, where the authentication request includes information about the currently accessed first service. The mobile phone determines an authentication manner corresponding to the first service, and then the authentication manner corresponding to the first service is obtained from the mobile phone. For example, the mobile phone determines that a target authentication manner of a face unlocking service is face authentication.

Optionally, the mobile phone may further query a resource pool, and determine that a PC side has a face acquisition capability. Therefore, the mobile phone determines that an authentication capability corresponding to a face unlocking operation is a face capability of a face of a mobile phone side, and an acquisition capability corresponding to the face unlocking operation is the face acquisition capability of the PC side. The mobile phone may send the determined face authentication manner, and information such as the face acquisition capability and a face authentication capability that are associated with the face authentication manner to the PC, so that the PC schedules the face acquisition capability to perform face acquisition.

In another possible manner, the PC and the mobile phone may pre-synchronize a resource to obtain a resource pool. The resource pool includes authentication manners corresponding to various operations in the mobile phone. Therefore, the PC may query a local resource pool to determine the authentication manner corresponding to the target operation. Optionally, the resource pool may further include a template of each piece of authentication information, for example, a fingerprint template or a face template.

Specifically, in this step, there may be a plurality of specific manners in which the PC or the mobile phone determines the target authentication manner corresponding to the first service.

Figures 6A, 6B:
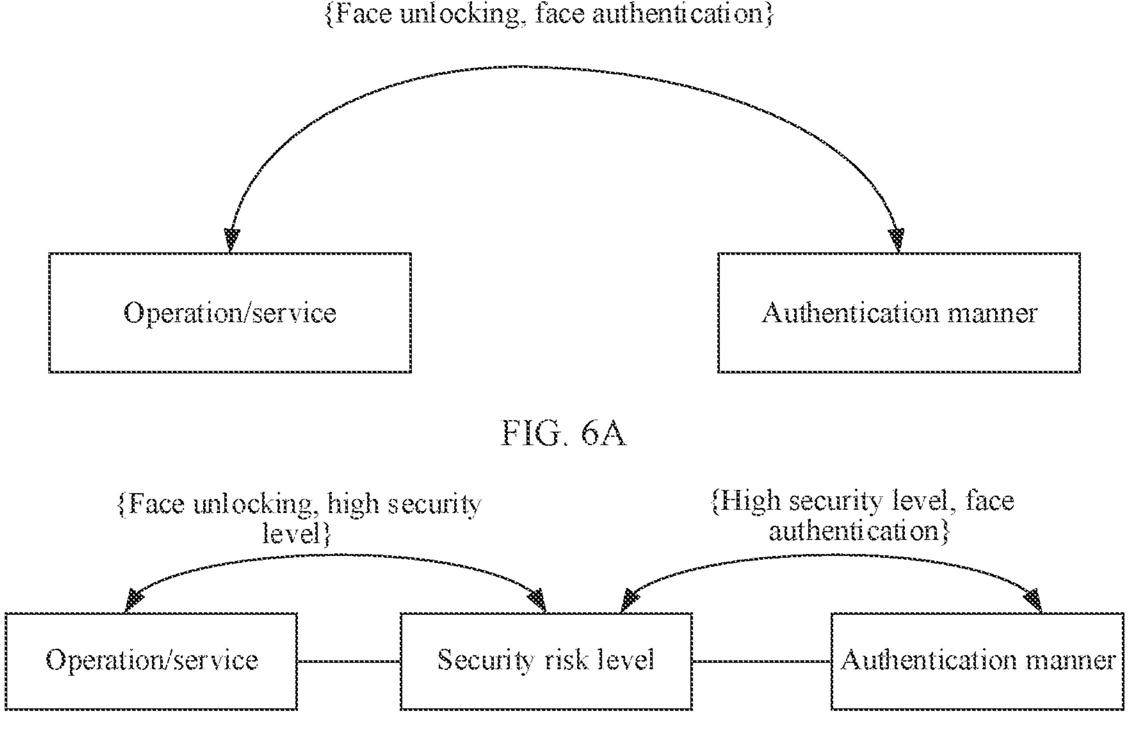
FIG. 6A and FIG. 6B are schematic diagrams of an authentication manner of a device according to an embodiment of this application.

Manner 1: As shown in FIG. 6A, the resource pool in the PC or the mobile phone may include a preset configuration table, where the preset configuration table includes a correspondence between each operation/service and an authentication manner. The PC or the mobile phone may determine the target authentication manner based on the first service by querying a local configuration table. If the target operation is unlocking a mobile phone screen with a face, the target authentication manner is face authentication. If the first service is a payment service, the target authentication manner is face authentication or fingerprint authentication.

It should be understood that in this embodiment, when the PC decides the target authentication manner, before performing S501, the PC may obtain the preset configuration table from the mobile phone, and then determine, by using the configuration table obtained from the mobile phone, the target authentication manner corresponding to the first service. Alternatively, the mobile phone may upload the preset configuration table to a server. The PC obtains the preset configuration table from the server, and then determines, by using the configuration table obtained from the server, the target authentication manner corresponding to the first service. In a possible case, the preset configuration table may be generated based on a configuration of a user using the mobile phone. In another possible case, the preset configuration table may alternatively be generated by a developer through configuration based on a service requirement.

Manner 2: As shown in FIG. 6B, the PC or the mobile phone may first determine a security risk level corresponding to an operation/service, and then determine an authentication manner corresponding to the security risk level.

It should be understood that, in a possible case, the developer may predefine a full set of operations/services (for example, opening a door, turning on a light, making payment, and accessing a safe), and then establish a fixed mapping relationship between an action in the full set of operations/services and a risk security level. For example, a security risk level corresponding to a door opening operation is defined as a high security risk level, and a security risk level corresponding to a light turning-on operation is defined as a low security risk level. For example, as shown in Table 1, a full set of operations (opening a door, turning on a light, making payment, accessing a confidential file, accessing a common file, and the like) is predefined in the PC or the mobile phone, and a mapping table between the operation and the security risk level is established, as shown in the following table.

| Operation/Service | Security risk level |
| --- | --- |
| Opening a door | High |
| Turning on a light | Low |
| Making payment | High |
| Accessing a confidential file | High |
| Accessing a common file | Medium |
| . . . | . . . |

In another possible case, the developer may dynamically determine, based on an analysis policy, the security risk level corresponding to the first service. For example, the analysis policy may be determining a correlation coefficient between the first service and privacy data of the user, and when the correlation coefficient is low, determining that the security risk level corresponding to the target operation is a low security risk level; when the correlation coefficient is medium, determining that the security risk level corresponding to the target operation is a medium security risk level; or when the correlation coefficient is high, determining that the security risk level corresponding to the target operation is a high security risk level. For example, the PC or the mobile phone determines, based on the analysis policy, that a correlation coefficient between the unlocking operation shown in FIG. 6B and the privacy data of the user is greater, and therefore determines that the security risk level of the door opening operation is the high security risk level. For example, the PC uses artificial intelligence to analyze a correlation degree between the target operation and the privacy data of the user, and dynamically determines a security risk level of a current service execution action based on a data analysis result. For example, see the following table.

| Operation/Service | Involved data | Security risk level |
| --- | --- | --- |
| Opening a door | Home data | High |
| Making payment | Payment data and user password | High |
| Turning on a light | Home data | Low |
| . . . | . . . | . . . |

In addition, it should be understood that, in Manner 2, a correspondence between the risk security level and the authentication manner needs to be pre-established. The developer may predefine reliability degrees of different authentication manners, and then match the correspondence between the security risk level and the authentication manner based on the reliability degrees, where a higher security risk level is matched to an authentication manner with a higher reliability degree, and a lower security risk level is matched to an authentication manner with a lower reliability degree. In this manner, because the first service is a service of the mobile phone, the mobile phone may first determine the security risk level corresponding to the operation/service, and then determine the authentication manner corresponding to the security risk level. The mobile phone may send the determined target authentication manner corresponding to the first service to the PC.

S503: The PC acquires authentication information of the user based on the target authentication manner.

In this embodiment, the authentication information is user information on which authentication needs to be performed in the target authentication manner, for example, information such as a fingerprint of the user, a face of the user, or a password entered by the user.

For example, as shown in FIG. 7A, when the PC receives the tap operation performed by the user on the face unlocking control 703 in the lock screen interface 702, the PC determines that the target authentication manner is face authentication, and authentication information of the user that needs to be acquired is a face image. The PC invokes the camera 701 of the PC to acquire the face image of the user.

S504: The PC sends an authentication request message to the mobile phone, where the authentication request message includes the authentication information, and the authentication request is for requesting to perform authentication on the first service.

For example, in a scenario shown in FIG. 7A, the PC obtains the face image from the camera, and sends a face authentication request message including the acquired face image to the mobile phone, where the face authentication request message is for requesting to perform face authentication on the face unlocking operation.

S505: The mobile phone receives the authentication request message, obtains the authentication information from the authentication request message, performs authentication on the target operation by using the authentication information, and generates an authentication result.

For example, the mobile phone receives a face image from the PC, performs face authentication by using the face image and a face template stored in the mobile phone, and generates a face authentication result. When the face authentication result is that the authentication succeeds, the mobile phone responds, that is, unlocks a screen, and displays an unlocked mobile phone interface. The PC also synchronously displays the unlocked mobile phone interface. When the face authentication result is that the authentication fails, the mobile phone responds, that is, displays an unlocking failure interface, and the PC also synchronously displays the unlocking failure interface.

In a possible embodiment, the method may further include the following step S506. The mobile phone may further send a response message of the authentication request message to the PC, where the response message includes the authentication result. In this embodiment, the mobile phone sends the authentication result to the PC. If the authentication result is that the authentication succeeds, the PC may prompt, in an interface, that the authentication of the user succeeds. If the authentication fails, the PC may prompt, in the interface, that the authentication of the user fails.

Figure 7B:
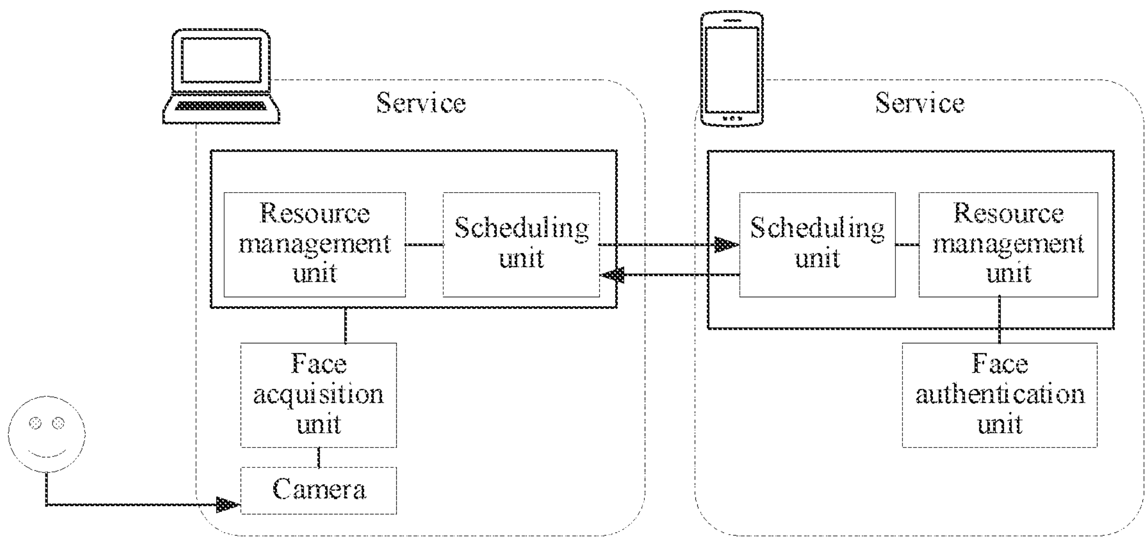
FIG. 7B is a schematic diagram of face authentication cooperatively performed by a PC and a mobile phone according to an embodiment of this application.

To describe the foregoing method more systematically, the following describes a process of unlocking the mobile phone screen shown in FIG. 7A with reference to FIG. 7B. A software architecture of the PC includes a resource management unit and a scheduling unit. In addition, the PC further includes a face acquisition unit. When the PC receives the face unlocking operation of the user, a service layer of the PC generates a face unlocking request, and then the resource management unit in the PC determines an acquisition capability related to face authentication. When the resource management unit determines that the face acquisition capability in the PC is available, the resource management unit indicates the face acquisition unit to perform face acquisition. The face acquisition unit invokes the camera to acquire a face of the user, and then the scheduling unit in the PC transmits the face image acquired by the face acquisition unit to the mobile phone, and a scheduling unit of the mobile phone schedules a face authentication unit to perform authentication on the face. Each functional unit in FIG. 7B is a service located in the PC or the mobile phone, and may be implemented in the internal memory 121 in FIG. 2. There may be a plurality of corresponding functional units or one integrated functional unit. This is not limited herein.

In a possible embodiment, in S502, if the PC determines that the target authentication manner corresponding to the target operation is a combination of at least two different authentication manners, the PC may acquire, in the PC, at least two pieces of authentication information corresponding to the target authentication manner, and then in S503, the PC sends the at least two pieces of authentication information to the mobile phone. The mobile phone performs authentication on the authentication information acquired by the PC by using an authentication information template stored locally in the mobile phone.

Figure 7C:
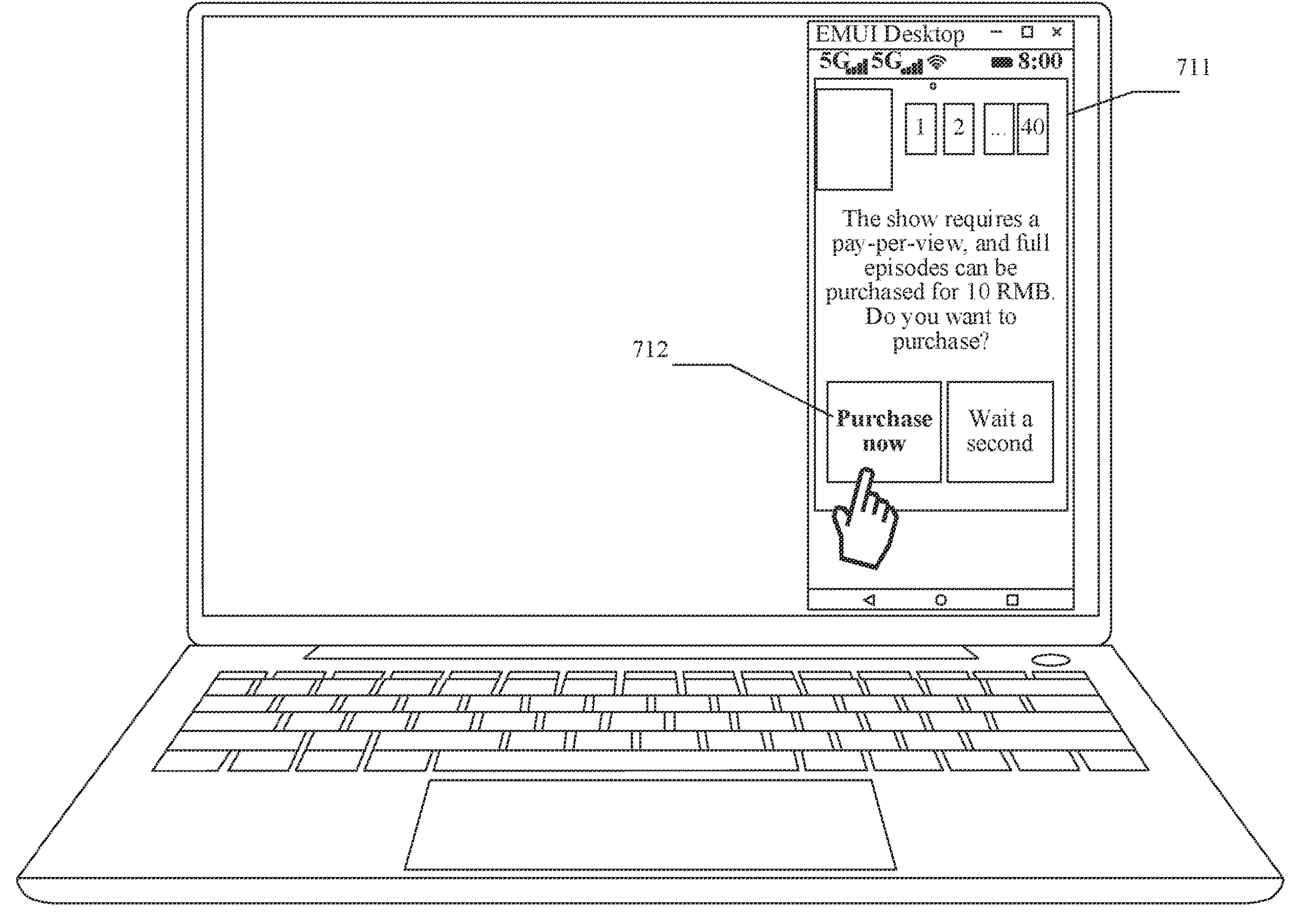
FIG. 7C is a schematic diagram of another PC interface according to an embodiment of this application.
Figure 7D:
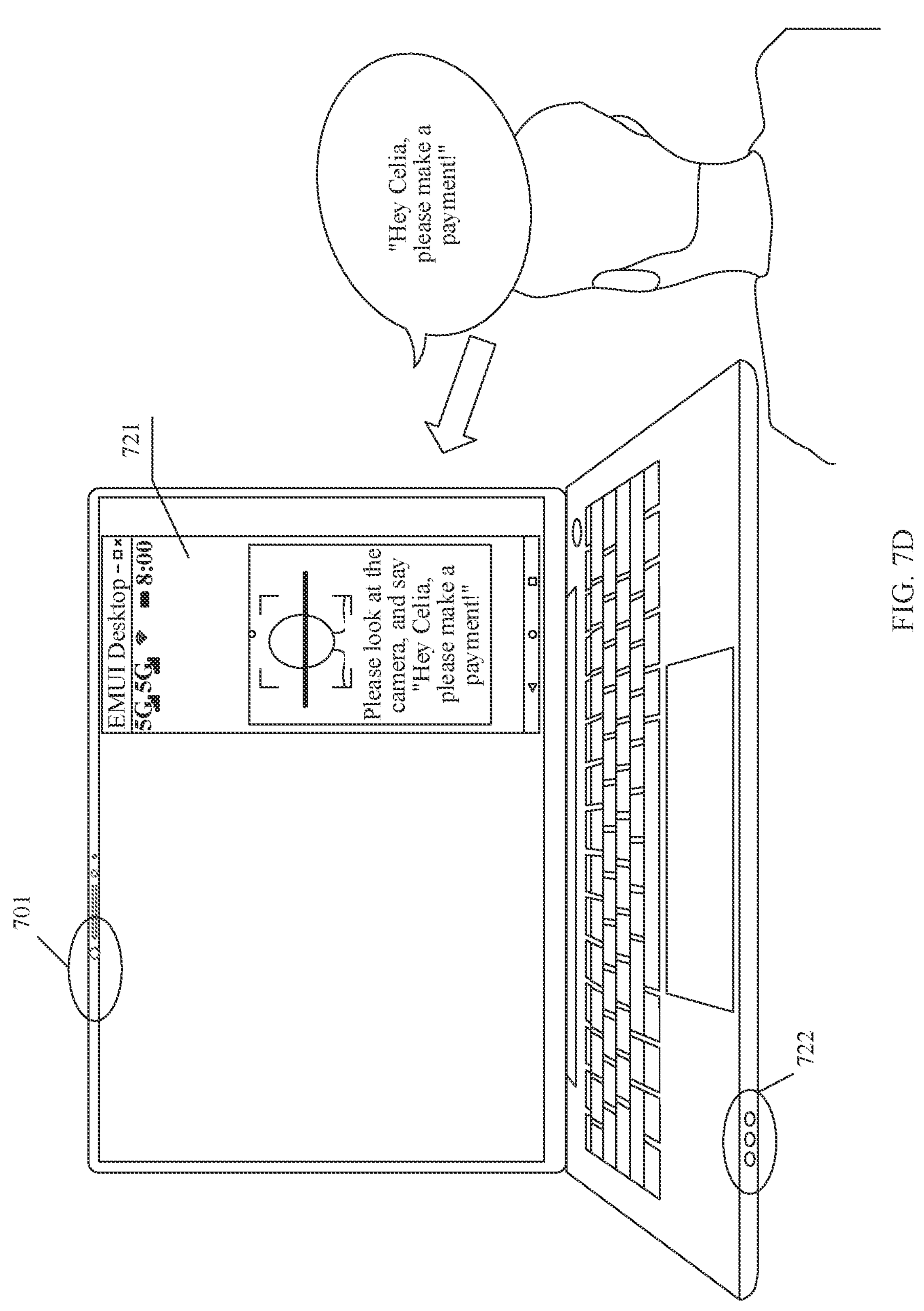
FIG. 7D is a schematic diagram of another PC interface according to an embodiment of this application.

For another example, an interface 711 is as shown in FIG. 7C, and the interface 711 prompts the user to pay for purchasing a video. When the user determines that a purchase is needed, the user may perform a tap operation on a "purchase now" control 712. After the PC receives the tap operation performed by the user on the "purchase now" control 712, the PC may determine that the target authentication manner corresponding to the payment operation includes face authentication and voiceprint authentication. As shown in FIG. 7D, the PC invokes the camera 701 of the PC and locally acquires, on the PC, a face image corresponding to the face authentication manner, and a display window 721 in the PC displays a preview effect of the face image acquired by the camera. In addition, the user sends a voice instruction "Hey Celia, please pay" based on an indication in the display window 721. The PC invokes a microphone 722 to locally acquire, on the PC, a voiceprint corresponding to the voiceprint authentication manner, and then sends, on the PC, the face image and the voiceprint to the mobile phone. The mobile phone performs authentication on the face image by using a face template locally stored in the mobile phone, and performs authentication on the voiceprint by using a voiceprint template locally stored in the mobile phone. The mobile phone obtains an authentication result of the payment operation with reference to a face authentication result and a voiceprint authentication result.

It can be seen from the foregoing embodiment that, in a multi-screen collaboration scenario, when a user accesses a service of another electronic device (for example, a mobile phone) on an electronic device (for example, a PC) and identity authentication needs to be performed, the user does not need to perform an operation on the another device, and can complete acquisition of authentication information on the electronic device currently operated by the user. Therefore, convenience of an authentication operation can be improved.

Embodiment 2

Figure 8:
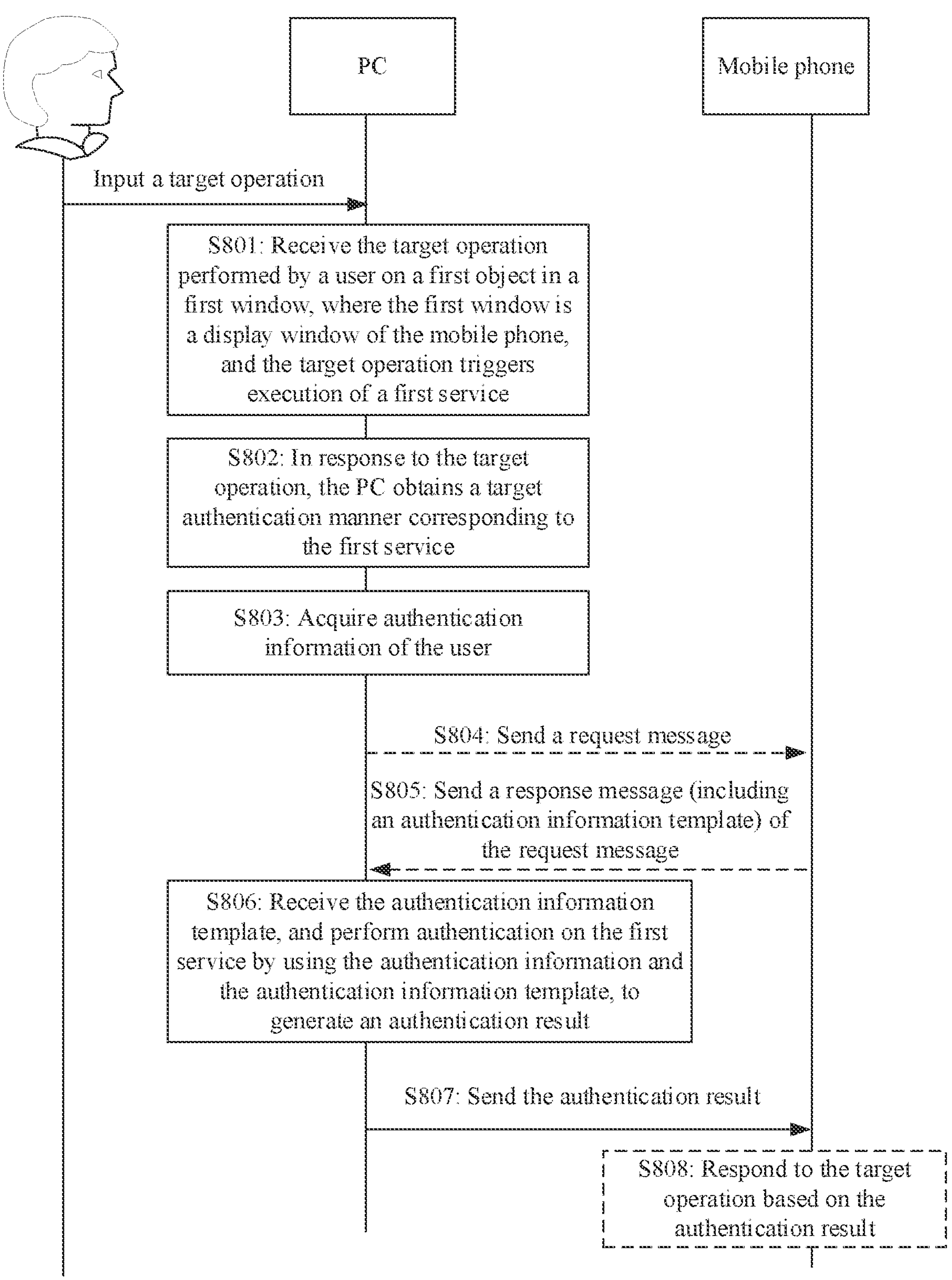
FIG. 8 is a schematic diagram of another cross-device authentication method according to an embodiment of this application.

A difference between Embodiment 2 and Embodiment 1 lies in that both an acquisition action and an authentication action may be performed on a same device. As shown in FIG. 8, the cross-device authentication method according to this embodiment of this application may include the following S801 to S808.

S801 to S803 are the same as the foregoing S501 to S503.

S804: The PC sends a request message to the mobile phone, where the request message is for requesting to obtain an authentication information template.

In this step, the authentication information template requested by the request message may be a secret template (for example, a lock screen password), or may be a biometric feature template (for example, a fingerprint template or a face template). Optionally, the request message includes a type of to-be-requested authentication information, so that the mobile phone determines the authentication information template based on the type of the authentication information.

S805: The mobile phone sends a response message of the request message to the PC. The response message of the request message includes the authentication information template.

It should be noted that, in a possible case, the PC and the mobile phone pre-establish a secure channel, and the mobile phone may send the response message to the PC through the secure channel. In another possible case, the PC and the mobile phone may pre-negotiate a negotiation key, and use the negotiation key to encrypt and transmit the authentication information template, and the PC may use the negotiation key to obtain the authentication information template through decryption.

It should be understood that if the PC and the mobile phone perform resource synchronization, and the resource pool in the PC includes the authentication information template on the mobile phone, the foregoing S804 and S805 may not be performed. In other words, S804 and S805 are optional steps, and are not mandatory steps. For example, the PC acquires a face image, performs face authentication by using the face image and a face template that has been stored in the PC resource pool, and generates a face authentication result. When the face authentication result is that the authentication succeeds, the mobile phone unlocks a screen, and displays an unlocked mobile phone interface. The PC also synchronously displays the unlocked mobile phone interface.

S806: The PC receives the authentication information template, and the PC performs authentication on the first service by using the authentication information and the authentication information template, and generates an authentication result.

S807: The PC sends the authentication result to the mobile phone.

Optionally, this step further includes S808: The mobile phone receives the authentication result from the PC, and responds to the target operation based on the authentication result. Optionally, after the mobile phone responds, the mobile phone may further send a response message of an authentication request message to the PC, where the response message includes the authentication result. In this embodiment, the mobile phone sends the authentication result to the PC. If the authentication result is that the authentication succeeds, the PC may prompt, in an interface, that the authentication of the user succeeds. If the authentication fails, the PC may prompt, in the interface, that the authentication of the user fails.

For example, as shown in FIG. 7A, the first window of the mobile phone is displayed in a PC interface, and the first window is a lock screen interface 702. Assuming that the user wants to unlock the mobile phone, the user may perform a tap operation on a face unlocking control 703 in the lock screen interface by operating a mouse of the PC. In other words, the PC may receive the tap operation performed by the user on the face unlocking control 703 in the lock screen interface 702, trigger the PC to obtain, from the mobile phone, that an authentication manner is face authentication, and then invoke a camera to acquire a face. In addition, the PC obtains a face template from the mobile phone, to perform authentication on acquired face information and generate an authentication result. For a detailed interface example, refer to the foregoing embodiment. Details are not described herein again.

It can be seen from the foregoing embodiment that, in a multi-screen collaboration scenario, a user accesses a service of another electronic device (such as a mobile phone) on an electronic device (such as a PC). When a device in which the service is located needs to perform identity authentication on the user, the user does not need to perform an operation on the accessed device, and can complete acquisition and authentication of authentication information on the electronic device currently operated by the user. Therefore, convenience of an authentication operation can be improved. If the electronic device currently operated by the user has a secure execution environment, while the another electronic device does not have the secure execution environment, security of an authentication result can also be improved.

Embodiment 3

A difference between Embodiment 3 and the foregoing two embodiments lies in that Embodiment 3 is not limited to being executed in the multi-screen collaboration scenario, and may be that a user triggers, on a first electronic device, a service request related to security of a second electronic device, to initiate cross-device authentication. In this embodiment, the following describes in detail the cross-device authentication method according to this embodiment by using an example in which the first electronic device is a smart television and the second electronic device is a mobile phone. For example, an input device of the smart television is a remote control, and the smart television further has a camera. It should be noted that the cross-device authentication method shown in this embodiment is also applicable to an electronic device of another type.

Figure 9:
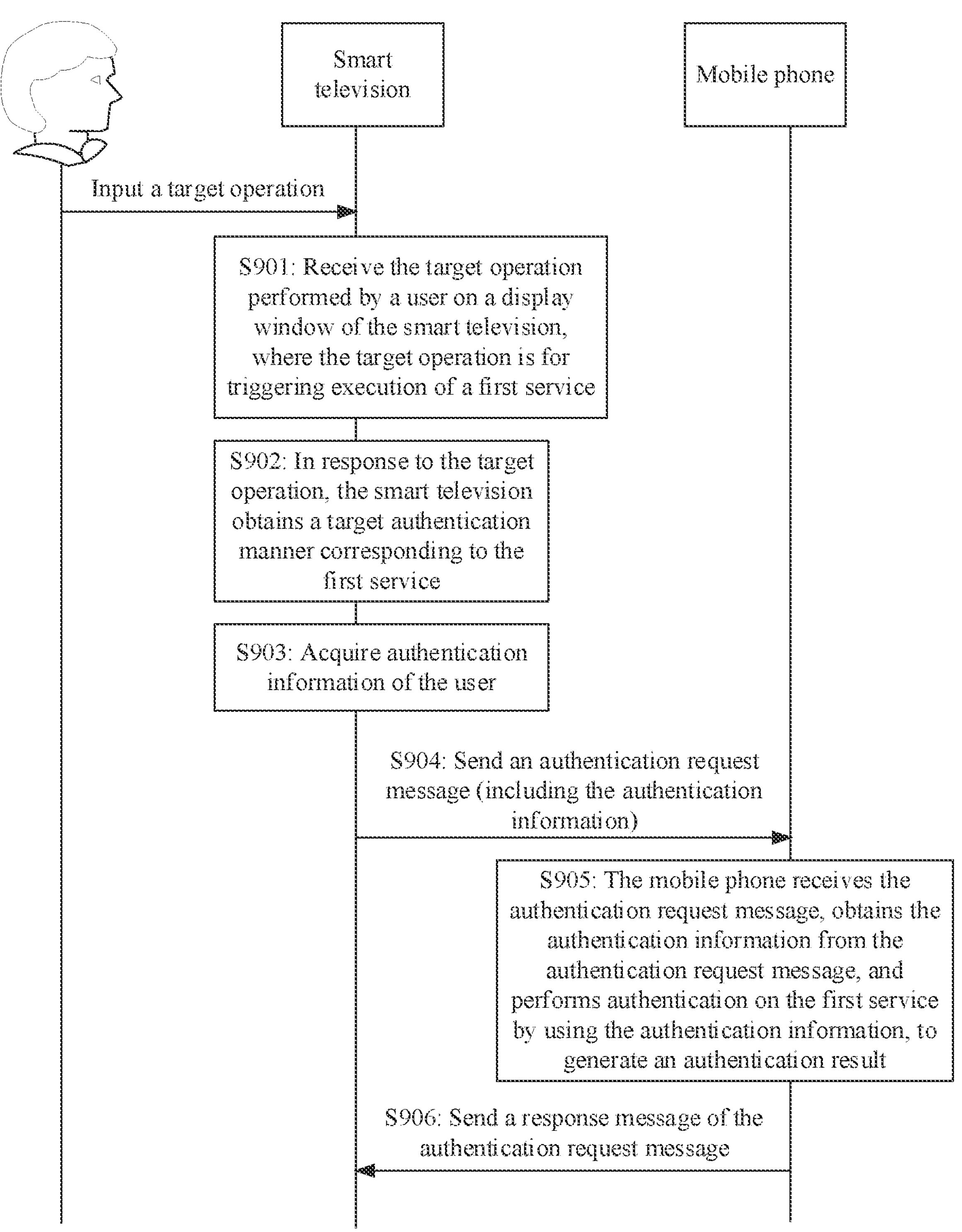
FIG. 9 is a schematic diagram of another cross-device authentication method according to an embodiment of this application.

As shown in FIG. 9, the cross-device authentication method according to this embodiment of this application may include the following S901 to S906.

S901: The smart television receives a target operation performed by a user on a display window of the smart television.

The target operation is for triggering execution of a first service. The first service is a service in the smart television, but the first service is associated with the mobile phone. In this embodiment, the first service is related to sensitive data in the mobile phone.

Figure 10:
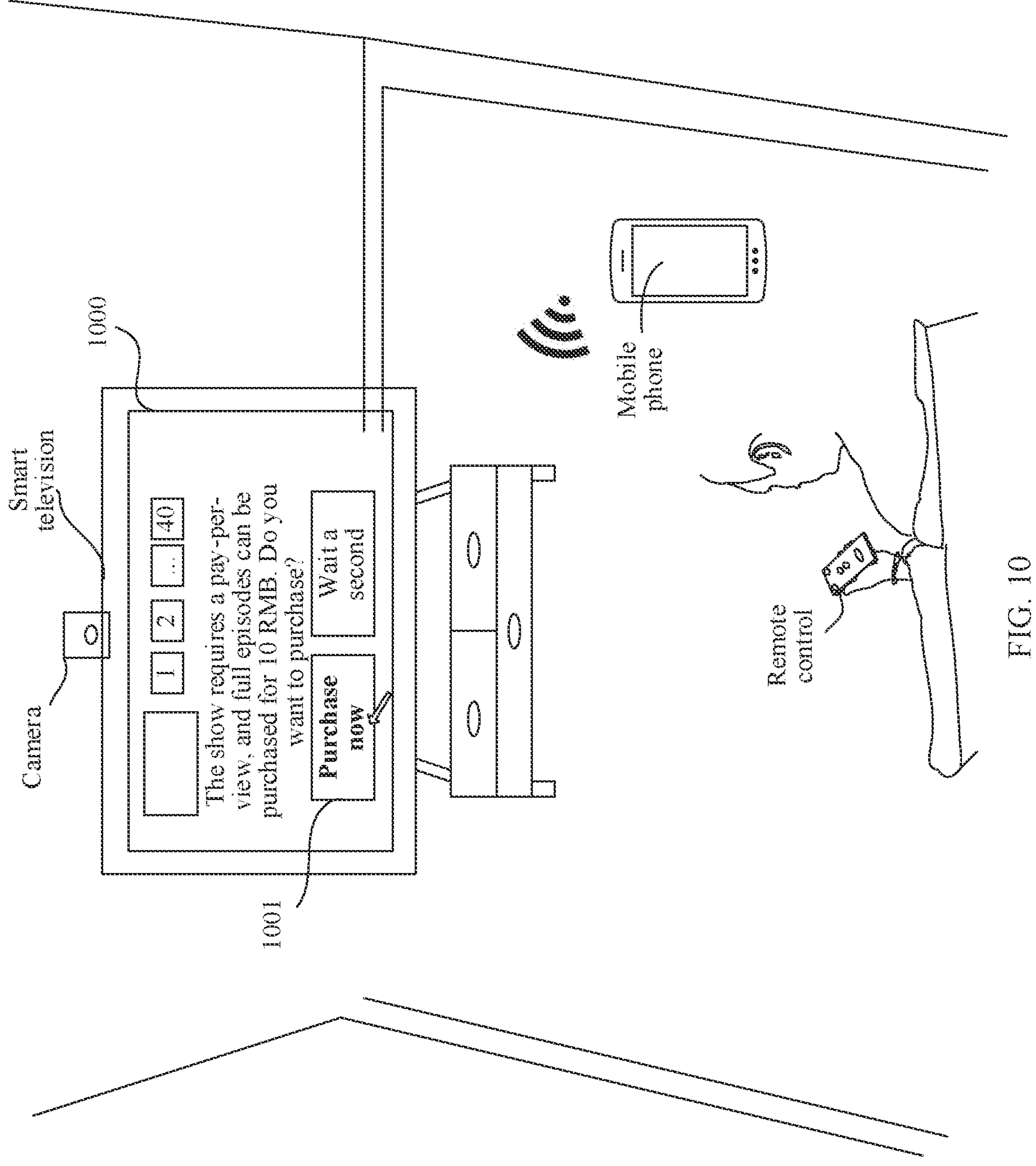
FIG. 10 is a schematic diagram of a payment scenario of a smart television according to an embodiment of this application.

For example, as shown in FIG. 10, a display window 1000 of a video application is displayed in a smart television interface, and the display window of the video application includes a "purchase now" control 1001. Assuming that the user wants to pay for watching a full set of videos, the user may perform a tap operation on the "purchase now" control 1001 in the display window of the video application by operating the remote control. In other words, the smart television may receive the tap operation performed by the user on the "purchase now" control 1001 in the display window 1000. It can be seen that, after a payment service is executed, user data in a payment-related APP in the mobile phone is changed, and the user data belongs to the sensitive data in the mobile phone. Therefore, the payment service in the smart television is associated with the sensitive data in the mobile phone. In this application, the sensitive data varies in different scenarios. For example, the sensitive data may be sensitive data such as user data in a device, and authentication information and device information of the user.

S902: In response to the target operation, the smart television obtains a target authentication manner corresponding to the first service.

For example, a resource pool of the smart television includes an authentication manner corresponding to each operation. The smart television may determine, by querying the resource pool, that the target authentication manner corresponding to the tap operation on the "purchase now" control 1001 is face authentication. Optionally, the smart television may further determine, by querying the resource pool, that a face acquisition unit corresponding to the face authentication manner on the smart television is available.

In addition, optionally, the smart television may request to obtain the target authentication manner from the mobile phone.

S903: The smart television acquires authentication information of the user based on the target authentication manner.

In this embodiment, the authentication information is user information on which authentication needs to be performed in the target authentication manner, for example, information such as a fingerprint of the user, a face of the user, or a password entered by the user.

For example, as shown in FIG. 10, when the smart television determines that the target authentication manner is face authentication, the authentication information of the user that needs to be acquired is a face image. The smart television invokes a camera 1003 of the smart television to acquire the face image of the user.

S904: The smart television sends the authentication information to the mobile phone.

For example, in the scenario shown in FIG. 10, the smart television obtains the face image from the camera, and sends the acquired face image to the mobile phone.

S905: The mobile phone receives the authentication request message, obtains the authentication information from the authentication request message, performs authentication on the target operation by using the authentication information, and generates an authentication result.

For a specific example, refer to S505.

S906: The mobile phone sends a response message of the authentication request message to the smart television, where the response message includes the authentication result.

In this embodiment, the mobile phone sends the authentication result to the smart television. If the authentication result is that the authentication succeeds, the smart television may prompt, in an interface, that the authentication of the user succeeds. If the authentication fails, the smart television may prompt, in the interface, that the authentication of the user fails.

S907: The smart television makes, based on the authentication result, a response corresponding to the target operation.

For example, if the authentication succeeds, the smart television displays a payment success; or if the authentication fails, the smart television displays a payment failure.

The foregoing steps S904 to S907 may further be that the smart television obtains an authentication information template from the mobile phone and performs authentication on a smart television side. Details are the same as steps S804 to S808 in Embodiment 2, which are not described herein.

In this embodiment, when a first service triggered by a user on a smart television is associated with a mobile phone, an authentication process of the service needs to be executed by the mobile phone, which can ensure device security of the mobile phone or security of sensitive data of the mobile phone. Then, the mobile phone sends an authentication result to the smart television, so that the smart television responds based on the authentication result.

Figure 11:
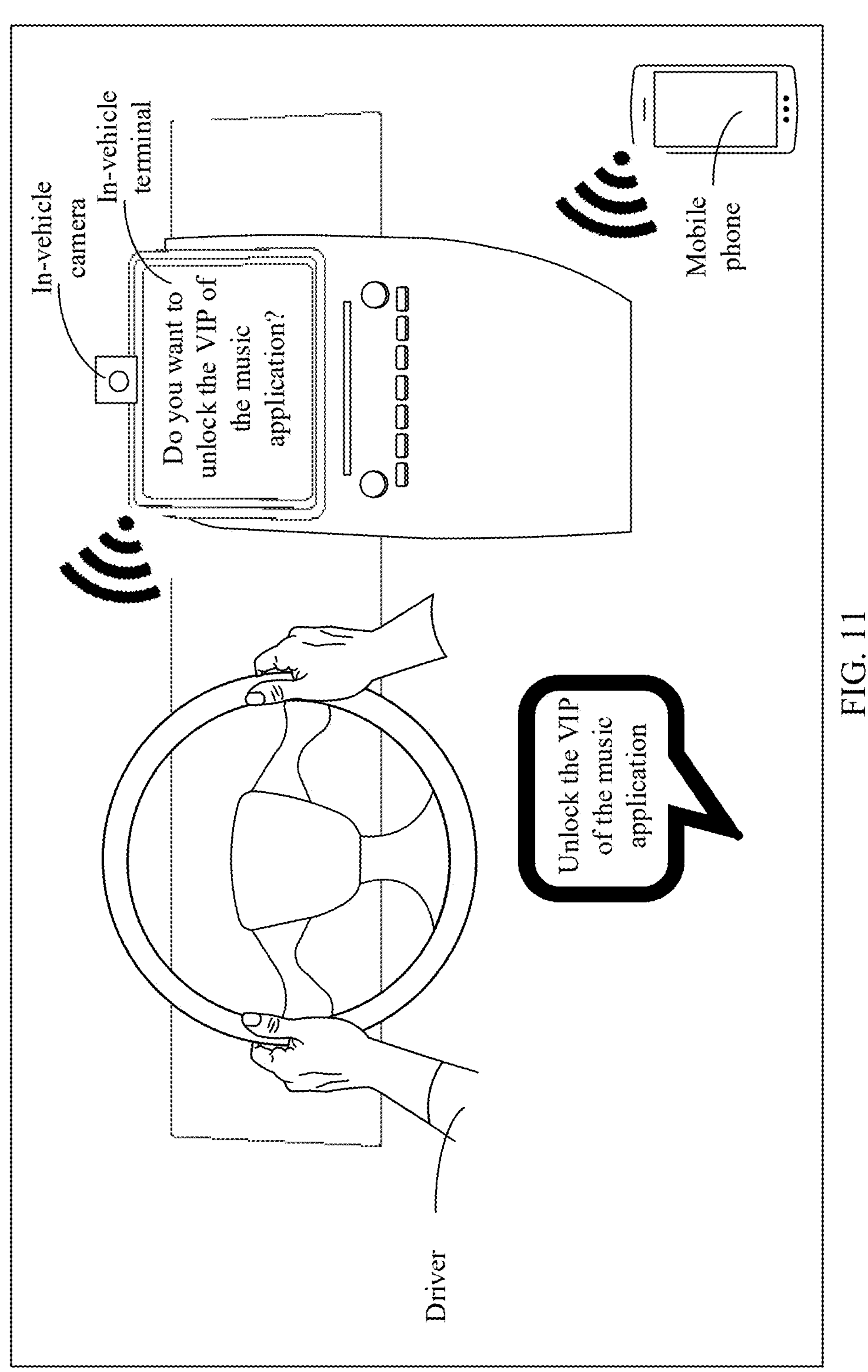
FIG. 11 is a schematic diagram of a driving scenario according to an embodiment of this application.

For another example, in a driving scenario, as shown in FIG. 11, an in-vehicle terminal and a mobile phone may cooperatively complete cross-device authentication. Specifically, a user sends a voice instruction "unlock a VIP of a music application" at a driver's seat. After receiving the voice instruction, the in-vehicle terminal sends a payment authentication request to the mobile phone. The mobile phone determines that an authentication operation corresponding to the payment operation is face authentication. Therefore, the mobile phone sends an authentication manner to the in-vehicle terminal. The in-vehicle terminal invokes a camera in the vehicle to acquire a face image, and then sends the face image to the mobile phone. The mobile phone performs authentication on the face image by using a locally stored face template, and generates an authentication result. Alternatively, the mobile phone determines that an authentication operation corresponding to the payment operation is face authentication. The in-vehicle terminal obtains, from the mobile phone, that an authentication manner is face authentication, and obtains a face template. The in-vehicle terminal performs face authentication and generates an authentication result. In other words, the cross-device authentication method shown in the foregoing embodiments is also applicable to collaborative authentication between the in-vehicle terminal and the mobile phone.

Figure 12:
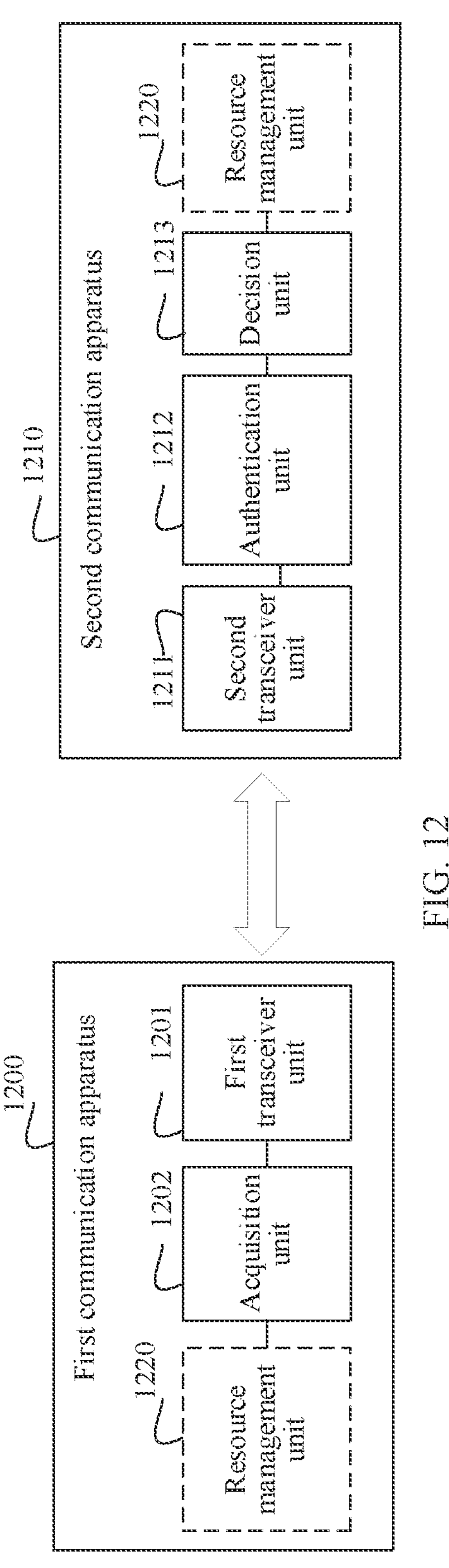
FIG. 12 is a schematic diagram of a structure of an apparatus according to an embodiment of this application.

Refer to FIG. 12. FIG. 12 is a schematic diagram of a structure of a communication system. The communication system may include a first communication apparatus 1200 and a second communication apparatus 1210. The first communication apparatus 1200 includes a first transceiver unit 1201 and an acquisition unit 1202.

The transceiver unit 1201 is configured to receive a target operation performed on a first interface of a first electronic device, where the target operation is for triggering access to a first service, and the first service is associated with a second electronic device.

The transceiver unit 1201 is further configured to obtain a target authentication manner corresponding to the first service.

The acquisition unit 1202 is configured to acquire authentication information.

Specifically, the communication apparatus 1200 may include at least one acquisition unit 1201, where one acquisition unit 1201 may be configured to acquire at least one type of authentication information (which is referred to as one type of authentication information for short in the following). In this embodiment of this application, an example in which one acquisition unit acquires one type of authentication information is used for description. The authentication information may be a fingerprint, a face, a heart rate, a pulse, a behavior habit, a device connection status, or the like. For example, a face acquisition unit may be configured to acquire a face, and the face acquisition unit may refer to the camera 193 shown in FIG. 3. A gait acquisition unit may be configured to acquire a gait, and the gait acquisition unit may refer to the camera 193 shown in FIG. 3. A pulse acquisition unit may be configured to acquire a pulse, and the pulse acquisition unit may refer to the pulse sensor 180N shown in FIG. 3. A heart rate acquisition unit may be configured to acquire a heart rate, and the heart rate acquisition unit may refer to the heart rate sensor 180P shown in FIG. 3. A touchscreen behavior acquisition unit may be configured to acquire a touchscreen behavior, and the touchscreen behavior acquisition unit may refer to the display screen 194 shown in FIG. 3. An acquisition unit of a trusted device may be configured to acquire a connection status and/or a wearing status of a wearable device.

The second communication apparatus 1210 includes a second transceiver unit 1211, an authentication unit 1212, and a decision unit 1213. Specifically, the second transceiver unit 1211 is configured to receive an authentication request, where the authentication request includes authentication information. Optionally, the second transceiver unit 1211 is further configured to receive a request message from the first electronic device, where the request message is for requesting the target authentication manner corresponding to the first service.

The authentication unit 1212 is configured to perform authentication based on the authentication information, and generate an authentication result. The authentication unit 1202 is generally an authentication service in software implementation, and is integrated into an operating system.

The communication apparatus 1200 may include at least one authentication unit 1202, where one authentication unit 1202 may be configured to perform authentication on at least one type of authentication information to obtain the authentication result. In this embodiment of this application, an example in which one authentication unit performs authentication on one type of authentication information is used for description. For example, a face authentication unit may be configured to perform authentication on a face to obtain a face authentication result; a gait authentication unit may be configured to perform authentication on gait information to obtain a gait authentication result; a pulse authentication unit may be configured to perform authentication on an acquired pulse to obtain a pulse authentication result; and a heart rate authentication unit may be configured to perform authentication on an acquired heart rate to obtain a heart rate authentication result; a touchscreen behavior authentication unit may be configured to perform authentication on acquired touchscreen behavior information to obtain a touchscreen behavior authentication result; and an authentication unit of a trusted device may be configured to perform authentication on an acquired connection status and/or wearing status of an electronic device to obtain an authentication result of the trusted device.

The decision unit 1213 is configured to determine the target authentication manner corresponding to the first service.

Optionally, the first communication apparatus and the second communication apparatus may further include a resource management unit 1220, configured to perform resource synchronization with another device in device networking and generate a resource pool, or maintain or manage a resource pool. The resource management unit 1220 includes the resource pool, and a resource in the resource pool may be an authentication factor (or information about the authentication factor), an acquisition capability of a device, an authentication capability of a device, or the like. The resource management unit 1220 may refer to the internal memory 121 shown in FIG. 3, and the internal memory 121 stores the resource pool.

Figure 13:
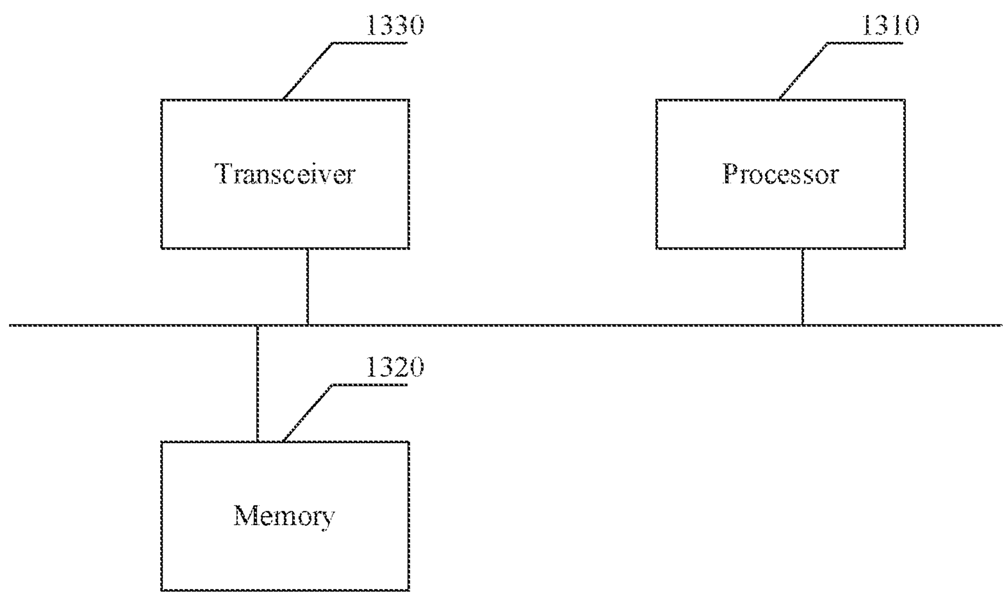
FIG. 13 is a schematic diagram of a structure of an electronic device according to an embodiment of this application.

Based on a same concept, FIG. 13 shows a device 1300 according to this application. The device 1300 may be a first electronic device, or may be a second electronic device. The device 1300 includes at least one processor 1310, a memory 1320, and a transceiver 1330. The processor 1310 is coupled to the memory 1320 and the transceiver 1330. The coupling in this embodiment of this application is an indirect coupling or communication connection between apparatuses, units, or modules, and may be in an electrical form, a mechanical form, or another form, and is for information exchange between the apparatuses, the units, or the modules. A connection medium between the transceiver 1330, the processor 1310, and the memory 1320 is not limited in this embodiment of this application. For example, in this embodiment of this application, the memory 1320, the processor 1310, and the transceiver 1330 may be connected through a bus in FIG. 13. The bus may be classified into an address bus, a data bus, a control bus, and the like.

Specifically, the memory 1320 is configured to store program instructions.

The transceiver 1330 is configured to receive or send data.

The processor 1310 is configured to invoke the program instructions stored in the memory 1320, so that the device 1300 is enabled to perform the steps performed by the foregoing electronic device 30, or perform the steps performed by the electronic device 10 or the electronic device 20 in the foregoing method.

In this embodiment of this application, the processor 1310 may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general purpose processor may be a microprocessor or any conventional processor or the like. The steps of the method disclosed with reference to embodiments of this application may be directly performed and completed by a hardware processor, or may be performed and completed by using a combination of hardware and software modules in the processor.

In this embodiment of this application, the memory 1320 may be a non-volatile memory, for example, a hard disk drive (hard disk drive. HDD) or a solid-state drive (solid-state drive, SSD), or may be a volatile memory (volatile memory), for example, a random-access memory (random-access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

It should be understood that the device 1300 may be configured to implement the method shown in embodiments of this application. For related features, refer to the foregoing descriptions. Details are not described herein again.

An embodiment of this application further provides a computer-readable storage medium. The computer-readable storage medium stores computer instructions, and when the computer instructions are run on an electronic device, the electronic device is enabled to perform the foregoing related method steps to implement the information sorting method in the foregoing embodiments.

An embodiment of this application further provides a computer program product. When the computer program product is run on a computer, the computer is enabled to perform the foregoing related steps, to implement the information sorting method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the information sorting method in the foregoing method embodiments.

The electronic device, the computer storage medium, the computer program product, or the chip provided in embodiments of this application may be all configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions may be allocated to and completed by different functional modules based on a requirement, that is, an inner structure of an apparatus is divided into different functional modules to complete all or a part of the functions described above.

In the several embodiments provided in this application, it should be understood that the disclosed apparatus and method may be implemented in other manners. For example, the described apparatus embodiment is merely an example. For example, division into modules or units is merely logical function division and may be another division during an actual implementation. For example, a plurality of units or components may be combined or integrated into another apparatus, or some features may be discarded or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first electronic device, wherein the method comprises:

providing access, by the first electronic device, to a plurality of services in a second electronic device, the plurality of services including at least a first service and a second service, wherein the first service is different than the second service, and wherein the first electronic device is in communication with the second electronic device;

receiving a target operation performed on a first interface of the first electronic device, wherein the target operation includes triggering access to one of the plurality of services in the second device;

obtaining a target authentication manner, wherein the target authentication manner is one of a first authentication manner corresponding to triggering of the first service or a second authentication manner corresponding to triggering of the second service, wherein the first authentication manner is different than the second authentication manner;

acquiring authentication information based on the target authentication manner; and sending an authentication request to the second electronic device, wherein the authentication request comprises the authentication information and is for requesting the second electronic device to perform authentication by the first authentication manner in response to triggering of the first service or by the second authentication manner in response to triggering of the second service.

2. The method of claim 1, further comprising:

receiving an authentication result from the second electronic device; and responding to the target operation based on the authentication result.

3. The method of claim 1, further comprising:

receiving an authentication result from the second electronic device; and switching, in response to the authentication result, from displaying the first interface to displaying a second interface, wherein the second interface comprises a result of triggering one of the first service or the second service.

4. The method of claim 1, further comprising performing multi-screen collaboration with the second electronic device, wherein the target operation is performed on a first object in a first window in the first interface, wherein the first window is a display window of the second electronic device.

5. The method of claim 1, wherein when the first service is a face unlocking service, the target authentication manner of the face unlocking service is a face authentication, and wherein when the first service is a fingerprint unlocking service, the target authentication manner of the fingerprint unlocking service is a fingerprint authentication.

6. The method of claim 1, wherein the target authentication manner is stored in a resource pool, and wherein the resource pool includes a list authentication manners, including the target authentication manner, and corresponding operations in the second electronic device.

7. A first electronic device comprising:

a memory configured to store instructions; and one or more processors coupled to the memory and configured to execute the instructions to cause the first electronic device to:

provide access, by the first electronic device, to a plurality of services in a second electronic device, the plurality of services including at least a first service and a second service, wherein the first service is different than the second service, and wherein the first electronic device is in communication with the second electronic device;

receive a target operation performed on a first interface of the first electronic device, wherein the target operation includes triggering access to one of the plurality of services in the second device;

obtain a target authentication manner, wherein the target authentication manner is one of a first authentication manner corresponding to triggering of the first service or a second authentication manner corresponding to triggering of the second service, wherein the first authentication manner is different than the second authentication manner;

acquire authentication information based on the target authentication manner; and send an authentication request to the second electronic device, wherein the authentication request comprises the authentication information and is for requesting the second electronic device to perform authentication by the first authentication manner in response to triggering of the first service or by the second authentication manner in response to triggering of the second service.

8. The first electronic device of claim 7, wherein the one or more processors are further configured to execute the instructions to cause the first electronic device to:

receive an authentication result from the second electronic device; and respond to the target operation based on the authentication result.

9. The first electronic device of claim 7, wherein the one or more processors are further configured to execute the instructions to cause the first electronic device to:

receive an authentication result from the second electronic device; and switch, in response to the authentication result, from displaying the first interface to displaying a second interface, wherein the second interface comprises a result of triggering one of the first service or the second service.

10. The first electronic device of claim 7, wherein the first service and the second service are associated with sensitive data of the second electronic device.

11. The first electronic device of claim 7, wherein the one or more processors are further configured to execute the instructions to cause the first electronic device to perform multi-screen collaboration with the second electronic device, wherein the target operation is performed on a first object in a first window in the first interface, wherein the first window is a display window of the second electronic device.

12. The first electronic device of claim 7, wherein when the first service is a face unlocking service, the target authentication manner of the face unlocking service is a face authentication, and wherein when the first service is a fingerprint unlocking service, the target authentication manner of the fingerprint unlocking service is a fingerprint authentication.

13. The first electronic device of claim 7, wherein the target authentication manner is stored in a resource pool, and wherein the resource pool includes a list authentication manners, including the target authentication manner, and corresponding operations in the second electronic device.

14. A non-transitory computer readable medium configured to store instructions that, when executed by a processor of an electronic device, cause the electronic device to:

provide access, by the first electronic device, to a plurality of services in a second electronic device, the plurality of services including at least a first service and a second service, wherein the first service is different than the second service, and wherein the first electronic device is in communication with the second electronic device;

receive a target operation performed on a first interface of the first electronic device, wherein the target operation includes triggering access to one of the plurality of services in the second device;

obtain a target authentication manner, wherein the target authentication manner is one of a first authentication manner corresponding to triggering of the first service or a second authentication manner corresponding to triggering of the second service, wherein the first authentication manner is different than the second authentication manner;

acquire authentication information based on the target authentication manner; and send an authentication request to the second electronic device, wherein the authentication request comprises the authentication information and is for requesting the second electronic device to perform authentication by the first authentication manner in response to triggering of the first service or by the second authentication manner in response to triggering of the second service.

15. The non-transitory computer readable medium of claim 14, wherein the instructions, when executed by the processor of the electronic device, further cause the electronic device to:

receive an authentication result from the second electronic device; and respond to the target operation based on the authentication result.

16. The non-transitory computer readable medium of claim 14, wherein the instructions, when executed by the processor of the electronic device, further cause the electronic device to:

receive an authentication result from the second electronic device; and switch, in response to the authentication result, from displaying the first interface to displaying a second interface, wherein the second interface comprises a result of triggering the one of the first service or the second service.

17. The non-transitory computer readable medium of claim 14, wherein the first service and the second service are associated with sensitive data of the second electronic device.

18. The non-transitory computer readable medium of claim 14, wherein the instructions, when executed by the processor of the electronic device, further cause the electronic device to:

perform multi-screen collaboration with the second electronic device, wherein the target operation is performed on a first object in a first window in the first interface, wherein the first window is a display window of the second electronic device.

19. The non-transitory computer readable medium of claim 14, wherein when the first service is a face unlocking service, the target authentication manner of the face unlocking service is a face authentication, and wherein when the first service is a fingerprint unlocking service, the target authentication manner of the fingerprint unlocking service is a fingerprint authentication.

20. The non-transitory computer readable medium of claim 14, wherein when the second service is a face unlocking service, the target authentication manner of the face unlocking service is a face authentication, and wherein when the second service is a fingerprint unlocking service, the target authentication manner of the fingerprint unlocking service is a fingerprint authentication.

* * * * *